US012593294B2

(12) United States Patent
Yang et al.

(10) Patent No.: US 12,593,294 B2
(45) Date of Patent: Mar. 31, 2026

(54) SIDELINK COMMUNICATION

(71) Applicant: LG Electronics Inc., Seoul (KR)

(72) Inventors: Yoonoh Yang, Seoul (KR); Sangwook Lee, Seoul (KR); Suhwan Lim, Seoul (KR); Jinyup Hwang, Seoul (KR); Jinwoong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 326 days.

(21) Appl. No.: 18/289,984

(22) PCT Filed: May 11, 2022

(86) PCT No.: PCT/KR2022/006712
§ 371 (c)(1),
(2) Date: Nov. 8, 2023

(87) PCT Pub. No.: WO2022/240169
PCT Pub. Date: Nov. 17, 2022

(65) Prior Publication Data
US 2024/0251368 A1      Jul. 25, 2024

(30) Foreign Application Priority Data

May 11, 2021      (KR) ........................ 10-2021-0060410

(51) Int. Cl.
*H04W 56/00* (2009.01)
*H04L 27/26* (2006.01)
*H04W 92/18* (2009.01)

(52) U.S. Cl.
CPC ... *H04W 56/0045* (2013.01); *H04L 27/26025* (2021.01); *H04W 92/18* (2013.01)

(58) Field of Classification Search
CPC ............. H04L 27/26025; H04L 5/0007; H04L 5/0092; H04W 4/40; H04W 56/0045; H04W 92/18; Y02D 30/70
See application file for complete search history.

(56) References Cited

U.S. PATENT DOCUMENTS

| | | | | |
|---|---|---|---|---|
| 2020/0275398 A1* | 8/2020 | Da | ........................ | H04L 5/0094 |
| 2022/0217671 A1* | 7/2022 | Kumar | ................... | H04W 64/00 |
| 2022/0295425 A1* | 9/2022 | Ren | ..................... | H04W 56/001 |
| 2023/0292273 A1* | 9/2023 | Zhang | ............... | H04W 56/0045 |
| 2023/0328597 A1* | 10/2023 | Xiong | ................... | H04L 5/0051 |
| | | | | 370/331 |

OTHER PUBLICATIONS

Ericsson, "SL UE synchronization issue for licensed operation," R4-2107243, 3GPP TSG-RAN WG4 Meeting #98-bis-e, Electronic Meeting, Apr. 12-20, 2021, 3 pages.
Extended European Search Report in European Appln. No. 22807816.8, mailed on Apr. 25, 2025, 10 pages.

(Continued)

*Primary Examiner* — Awet Haile
(74) *Attorney, Agent, or Firm* — Fish & Richardson P.C.

(57) ABSTRACT

A disclosure of the present specification provides a method for performing communication by a base station. The method may comprise the steps of: transmitting a TA offset for UL communication to a UE; determining an SCS for SL communication; and transmitting SL configuration information including information on the SCS for SL communication to the UE.

8 Claims, 22 Drawing Sheets

(56) References Cited

OTHER PUBLICATIONS

LG Electronics, "Impact on RRM Core requirements for NR SL enhancement," R4-2109715, 3GPP TSG-RAN WG4 Meeting #99-e, Electronic Meeting, May 19-27, 2021, 9 pages.
LG Electronics, "RRM requirements for NR SL enhancement," R4-2112338, 3GPP TSG-RAN WG4 Meeting #100-e, Electronic Meeting, Aug. 16-27, 2021, 9 pages.

* cited by examiner

Figure 2:
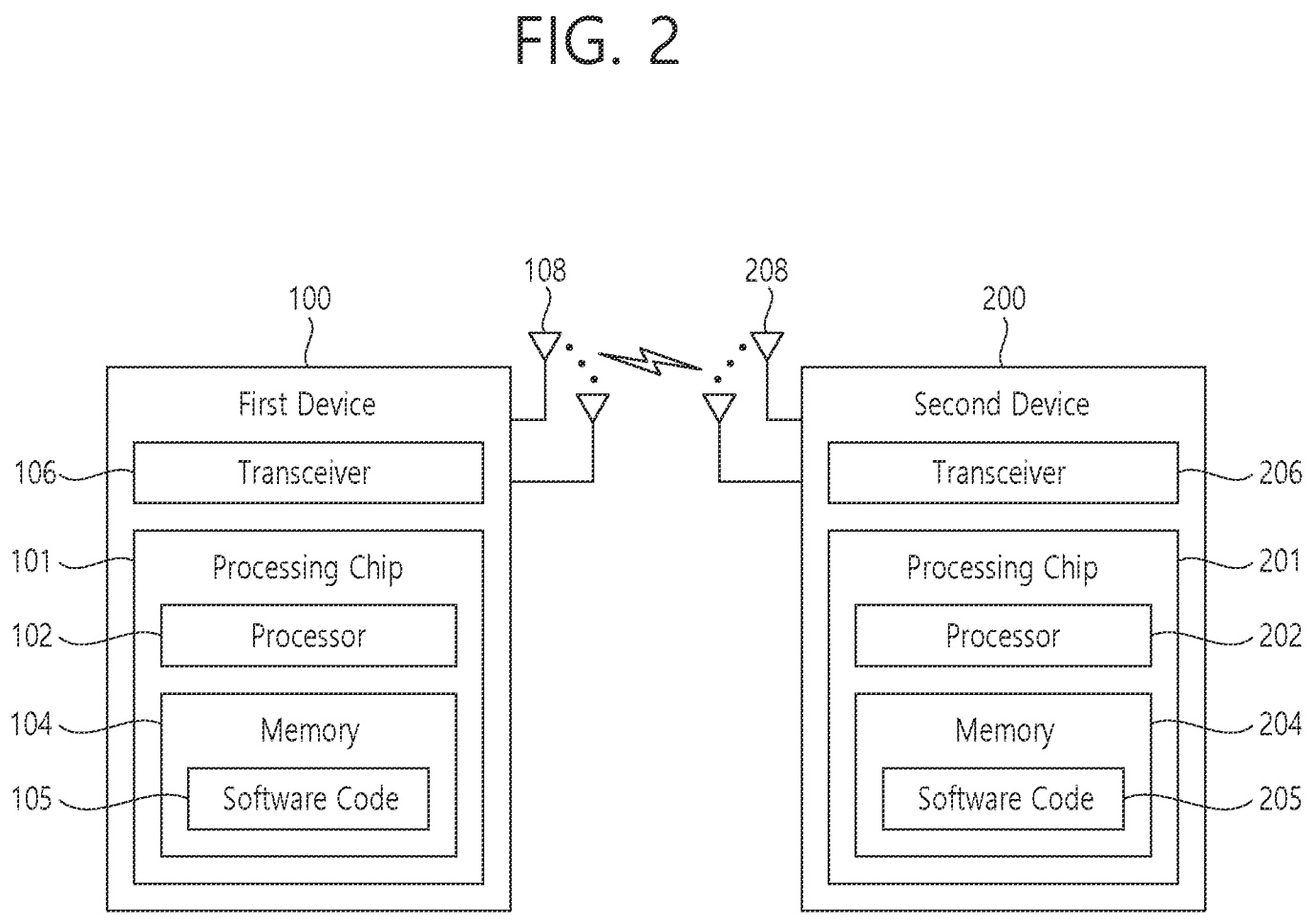

Second Device — 200

- Transceiver — 206
- Processing Chip — 201
  - Processor — 202
  - Memory — 204
    - Software Code — 205

208

108

First Device — 100

- Transceiver — 106
- Processing Chip — 101
  - Processor — 102
  - Memory — 104
    - Software Code — 105

FIG. 3

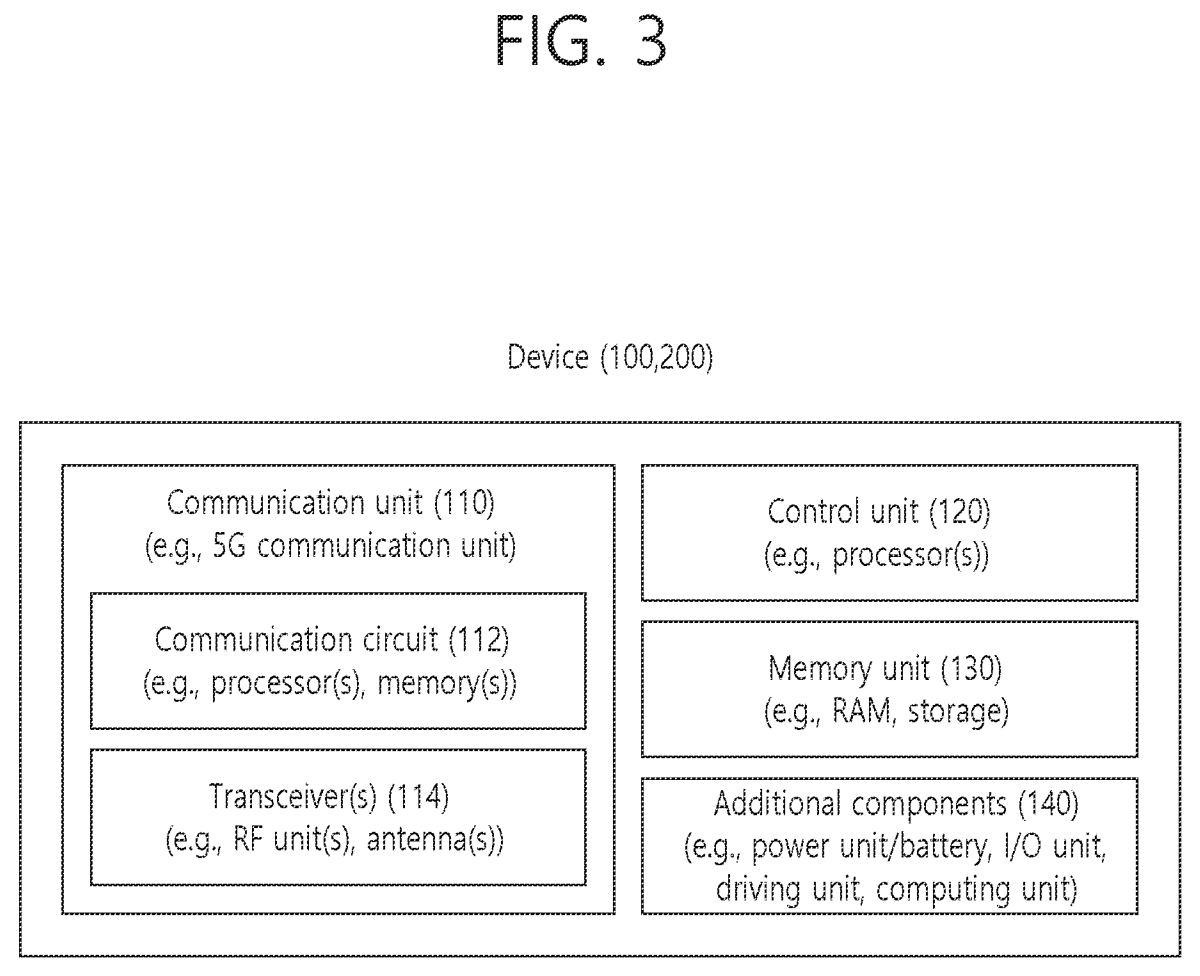

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

FIG. 5

BS(e.g. eNB or gNB)

SIDELINK COMMUNICATION

CROSS-REFERENCE TO RELATED APPLICATIONS

This application is a National Stage application under 35 U.S.C. § 371 of International Application No. PCT/KR2022/006712, filed on May 11, 2022, which claims the benefit of Korean Patent Application No. 10-2021-0060410, filed on May 11, 2021. The disclosures of the prior applications are incorporated by reference in their entirety.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Sidelink (SL) communication is a communication scheme in which a direct link is established between User Equipments (UEs), and the UEs exchange voice and data directly with each other without intervention of a base station (BS). SL communication is under consideration as a solution to the overhead of a BS caused by rapidly increasing data traffic.

A terminal may support both Uu-link and sidelink (SL) in the same licensed band. In the prior art, when such a terminal performs UL and SL transmissions, it has not been discussed how the UL and SL transmissions can operate without interfering with each other.

SUMMARY

Accordingly, a disclosure of the present specification has been made in an effort to solve the aforementioned problem.

In order to solve the above problems, one disclosure of the present specification provides a method for a base station to perform communications. The method may include: transmitting a TA offset for UL communication to a UE; determining a SCS for SL communication; and transmitting SL configuration information including information about the SCS for the SL communication to the UE.

In order to solve the above problems, one disclosure of the present specification provides a base station performing communication. The base station includes at least one transceiver; at least one processor; and at least one memory that stores instructions and is operatively electrically connectable with the at least one processor. The operations performed based on the instructions being executed by the at least one processor may include: transmitting a TA offset for UL communication to a UE; determining a SCS for SL communication; and transmitting SL configuration information including information about the SCS for the SL communication to the UE.

In order to solve the above problems, one disclosure of the present specification provides a method for a UE to perform communication. The method may include: receiving, from a base station, a TA offset for UL communication; receiving, from the base station, SL configuration information including information about an SCS for SL communication; and transmitting, based on the SL configuration information, an SL signal.

In order to solve the above problems, one disclosure of the present specification provides a UE performing communication. The UE includes at least one transceiver; at least one processor; and at least one memory that stores instructions and is operatively electrically connectable with the at least one processor. The operations performed based on the instructions being executed by the at least one processor may include: receiving, from a base station, a TA offset for UL communication; receiving, from the base station, SL configuration information including information about an SCS for SL communication; and transmitting, based on the SL configuration information, an SL signal.

In order to solve the above problems, one disclosure of the present specification provides a device in mobile communication. The device includes at least one processor; and at least one memory that stores instructions and is operably electrically connectable with the at least one processor, wherein operations performed based on the instructions being executed by the at least one processor, may include: obtaining a TA offset for UL communication; obtaining SL configuration information including information about an SCS for SL communication; and generating the SL configuration information, an SL signal.

In order to solve the above problems, one disclosure of the present specification provides a non-volatile (non-volatile) computer readable storage medium recording instructions. The instructions, when executed by one or more processors, cause the one or more processors to perform operations comprising: obtaining a TA offset for UL communication; obtaining SL configuration information including information about an SCS for SL communication; and generating the SL configuration information, an SL signal.

According to the disclosure of the present specification, it is possible to solve the problems of the prior art.

For example, the present disclosure may enable a terminal that supports both Uu communication and SL communication to efficiently and/or seamlessly perform UL communication and SL communication.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 1 shows an example of a communication system to which implementations of the present disclosure are applied.

FIG. 2 shows an example of wireless devices to which implementations of the present disclosure are applied.

FIG. 3 shows an example of a wireless device to which implementations of the present disclosure are applied.

FIG. 5 illustrates an example of a structure of a slot of an NR system to which the implementation of the present disclosure is applied.

Figure 12B:
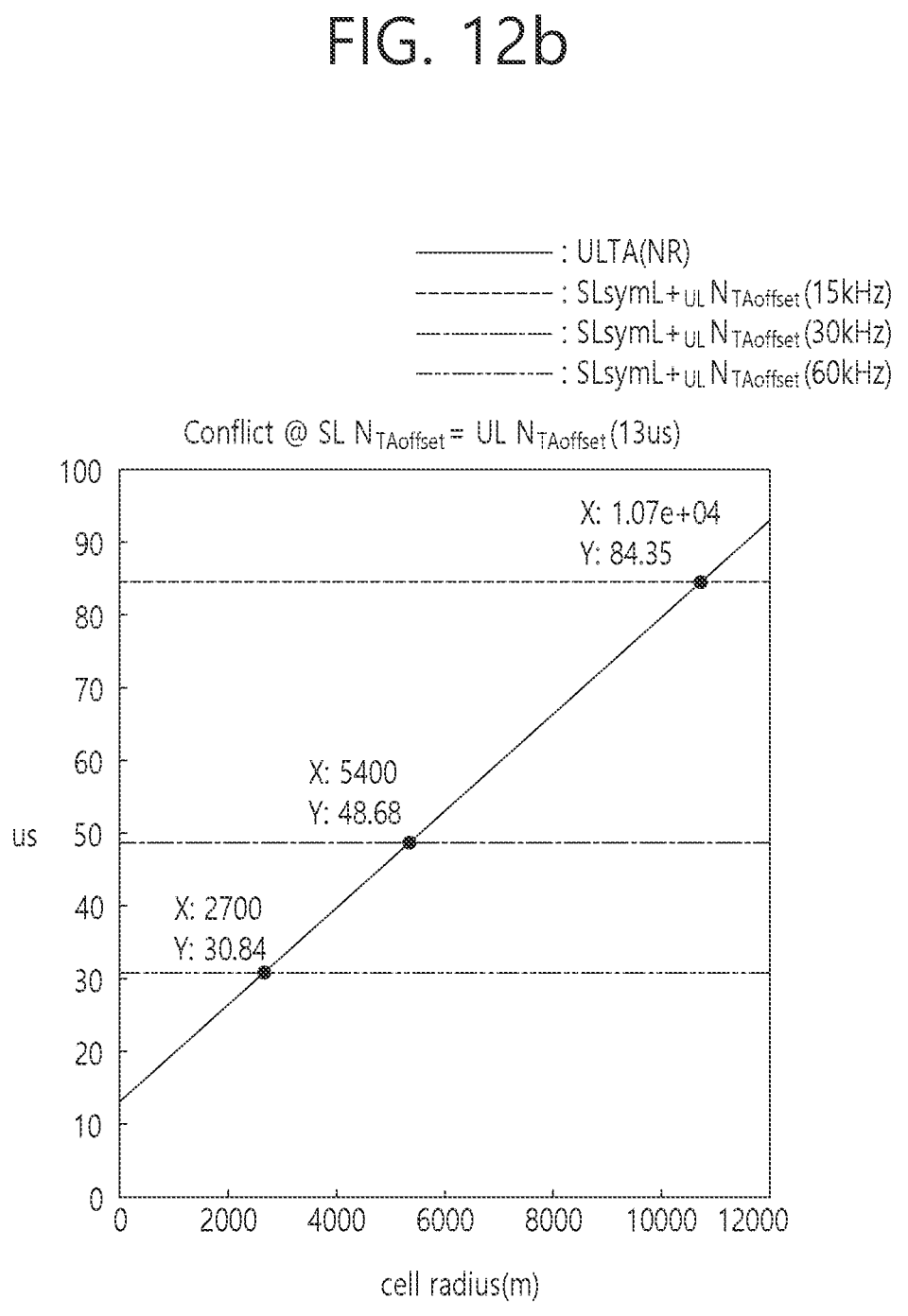

FIGS. 12a to 12c illustrate an example of a conflicted point in UL transmission and SL transmission.

DETAILED DESCRIPTION

Figure 4:
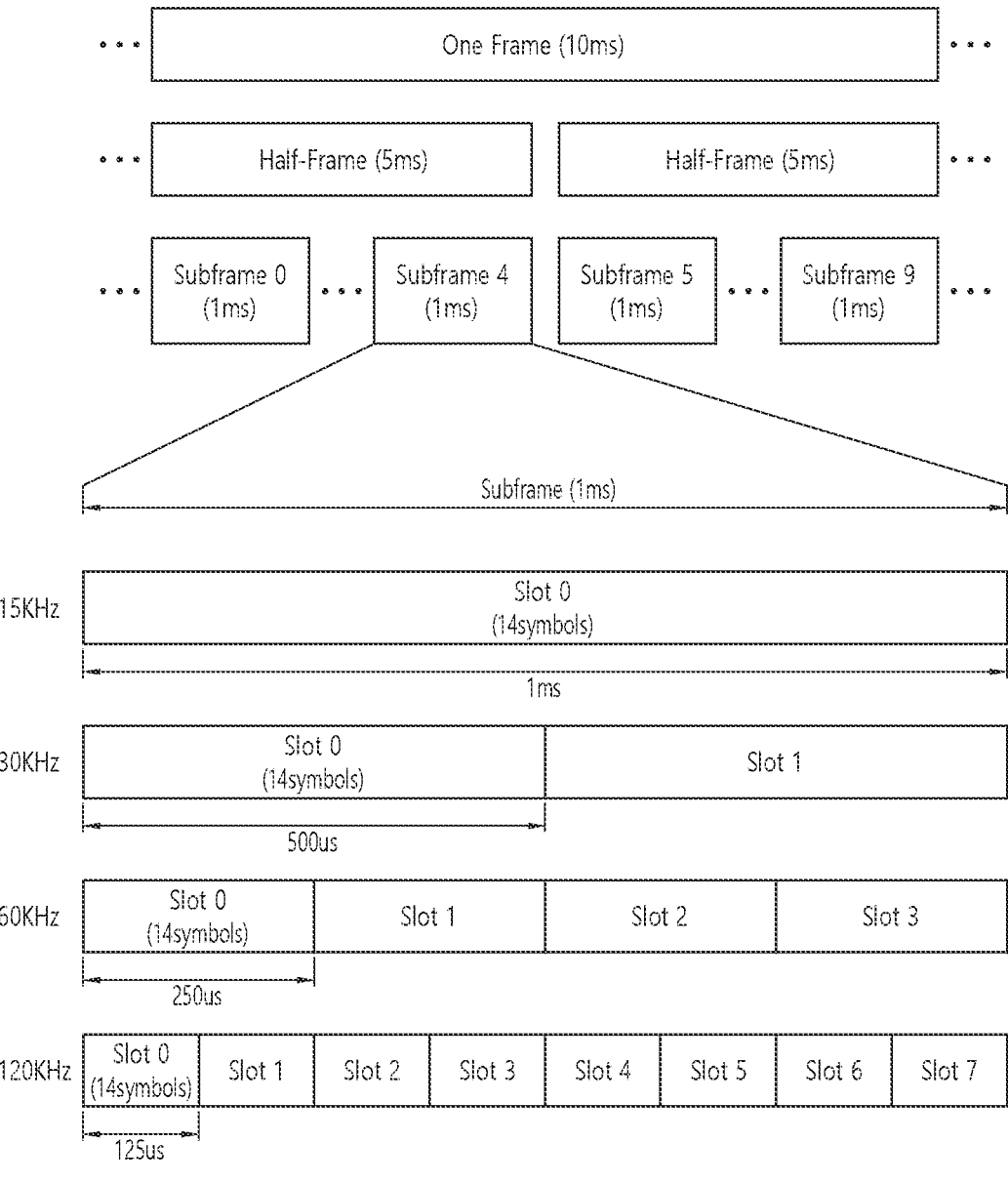
FIG. 4 illustrates an example of a structure of an NR system to which the implementation of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A". "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

In the accompanying drawings, a User Equipment (UE) is shown in an exemplary manner, however, the shown UE may also be referred to as a term such as a Terminal, a Mobile Equipment (ME), and the like. Furthermore, the UE may be not only a portable device such as a notebook, a mobile phone, a PDA, a smart phone, a multimedia device, and the like, but also a non-portable device such as a PC and a vehicle mounted device.

Hereinafter, a UE is used as an example of a wireless communication device (or wireless apparatus or a wireless device) for which wireless communication is available. The operation performed by a UE may be performed by a wireless communication device. The wireless communication device may also be referred to as a wireless apparatus or a wireless device. Hereinafter, an AMF may mean an AMF node, an SMF may mean an SMF node, and a UPF may mean a UPF node.

The term, "base station" used below may be referred to as a fixed station that communicates with a wireless device, generally, and may also be called a different term such as an evolved-NodeB (eNodeB), an evolved-NodeB (eNB), a Base Transceiver System (BTS), an Access Point, a Next generation NodeB (gNB), and the like.

Figure 1:
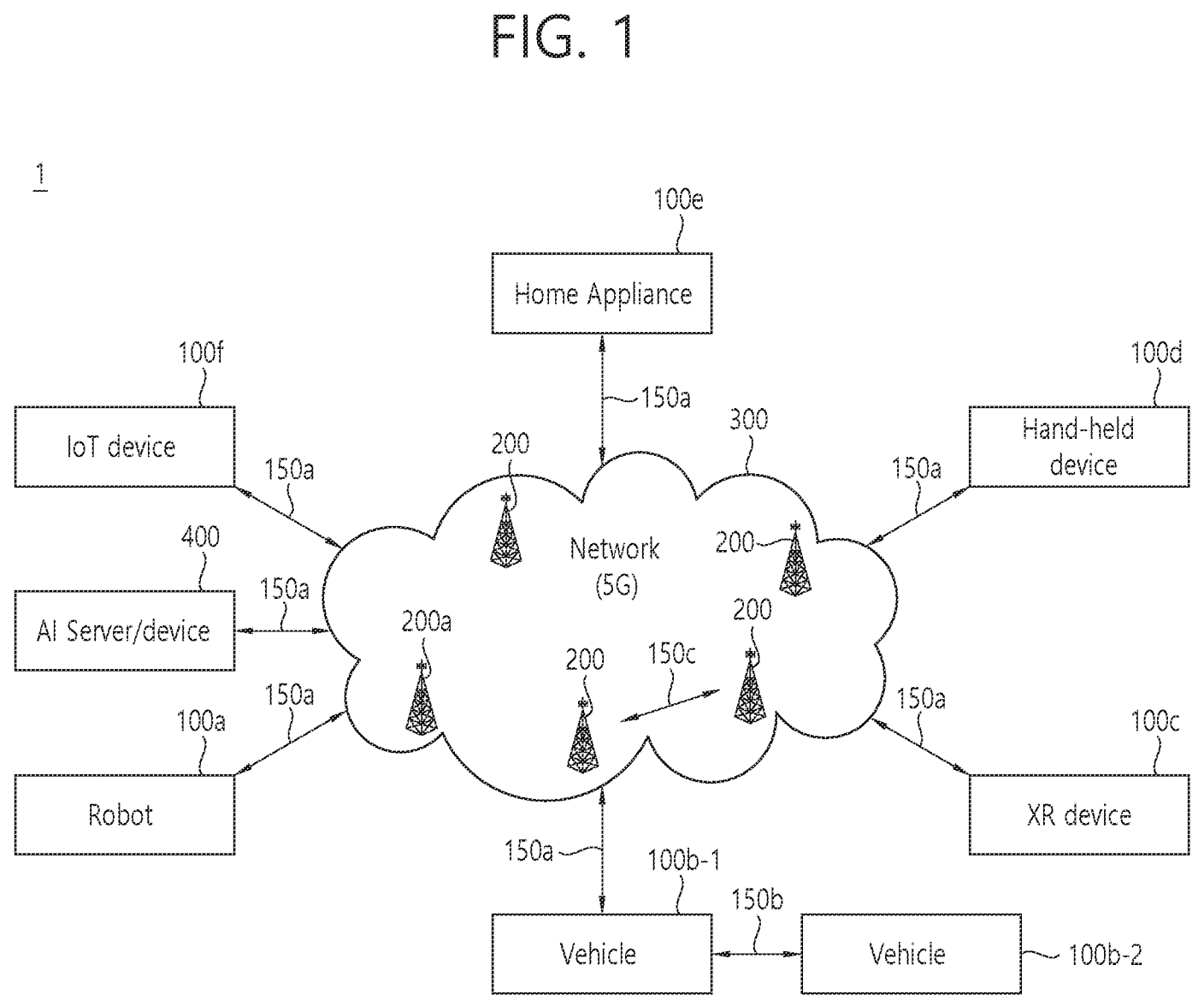

I. Technique and Procedure Applicable to the Disclosure of the Present Specification FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs. SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs. SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

FIG. 4 illustrates an example of a structure of an NR system to which the implementation of the present disclosure is applied.

FIG. 4 shows a structure of an NR system, in accordance with an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In the case that a normal CP is used, each slot may include 14 symbols. In the case that an extended CP is used, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Figure 5:
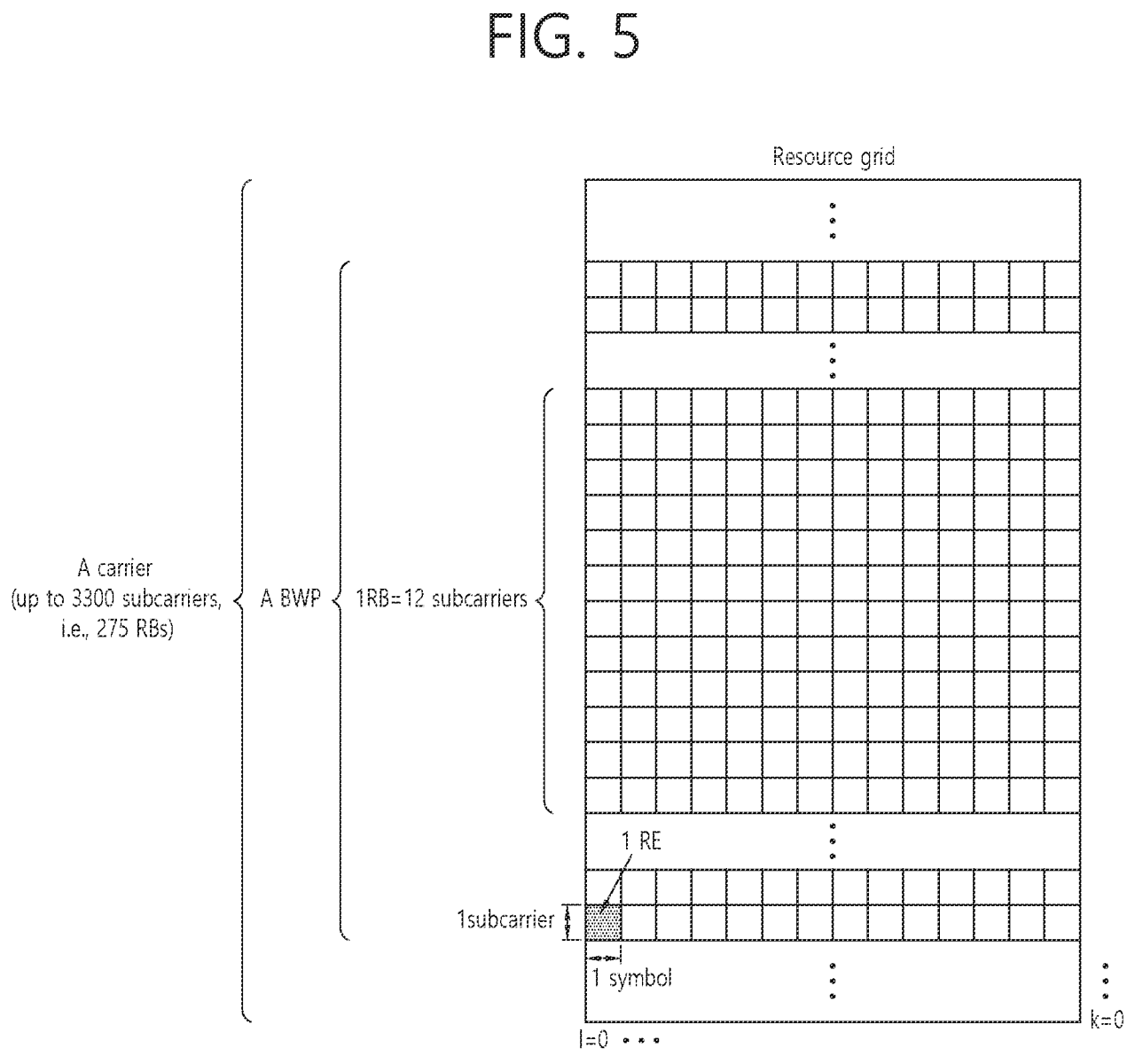

FIG. 5 illustrates an example of a structure of a slot of an NR system to which the implementation of the present disclosure is applied.

FIG. 5 shows a structure of a slot of an NR frame, in accordance with an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one type of numerology (e.g., SCS, CP length, etc.). A carrier may include a maximum of N BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, V2X or SL communication will be described.

Figure 6A:
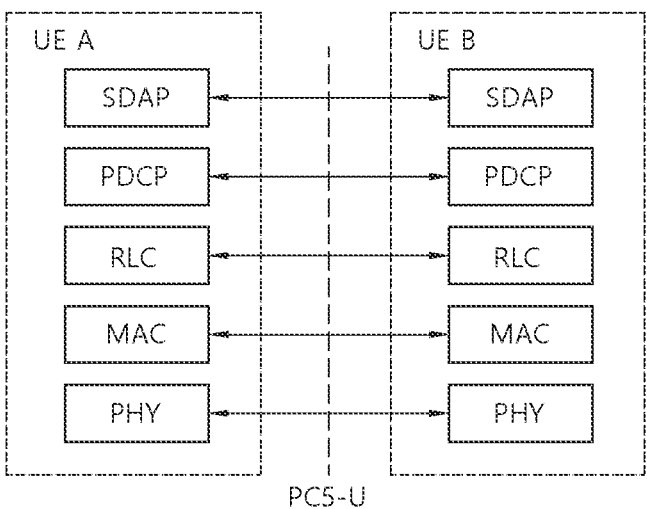
FIGS. 6a and 6b illustrate an example of a radio protocol architecture for a SL communication to which the implementation of the present disclosure is applied.
Figure 6B:
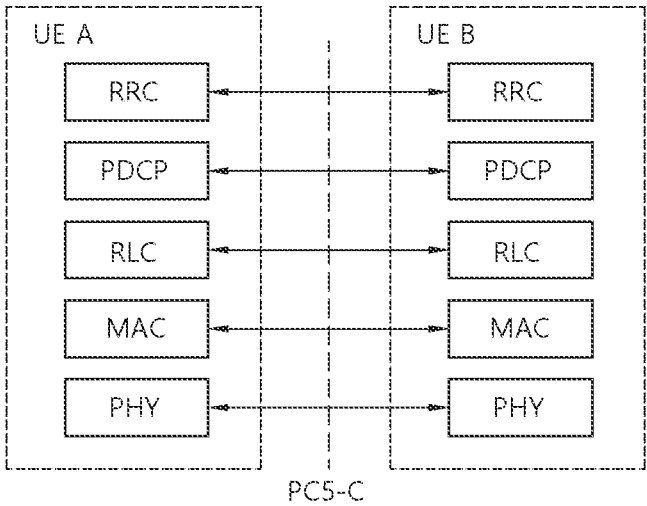

FIGS. 6a and 6b illustrate an example of a radio protocol architecture for a SL communication to which the implementation of the present disclosure is applied.

FIG. 6a and FIG. 6b show a radio protocol architecture for a SL communication, in accordance with an embodiment of the present disclosure. The embodiment of FIG. 6a and FIG. 6b may be combined with various embodiments of the present disclosure. More specifically, FIG. 6a shows a user plane protocol stack, and FIG. 6b shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which needs to be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
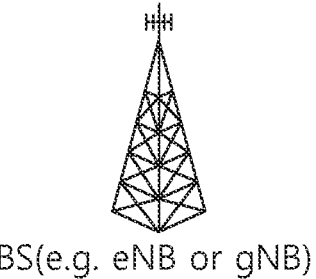
FIG. 7 illustrates an example of a UE performing V2X or SL communication to which the implementation of the present disclosure is applied.
Figure 7:
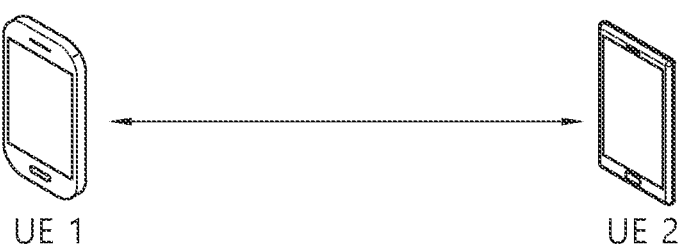

FIG. 7 illustrates an example of a UE performing V2X or SL communication to which the implementation of the present disclosure is applied.

FIG. 7 shows a UE performing V2X or SL communication, in accordance with an embodiment of the present disclosure. The embodiment of FIG. 7 may be combined with various embodiments of the present disclosure.

Referring to FIG. 7, in V2X or SL communication, the term "terminal" may generally imply a UE of a user. However, in the case that a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, in the case that the UE 1 is within a connectivity range of the BS, the BS may inform the UE 1 of the resource pool. On the other hand, in the case that the UE 1 is out of the connectivity range of the BS, another UE may inform the UE 1 of the resource pool, or the UE 1 may use a pre-configured resource pool.

In general, the resource pool may be configured in units of a plurality of resources, and each UE may select a unit of one or a plurality of resources to use it in SL signal transmission thereof.

Hereinafter, resource allocation in SL will be described.

Figure 8A:
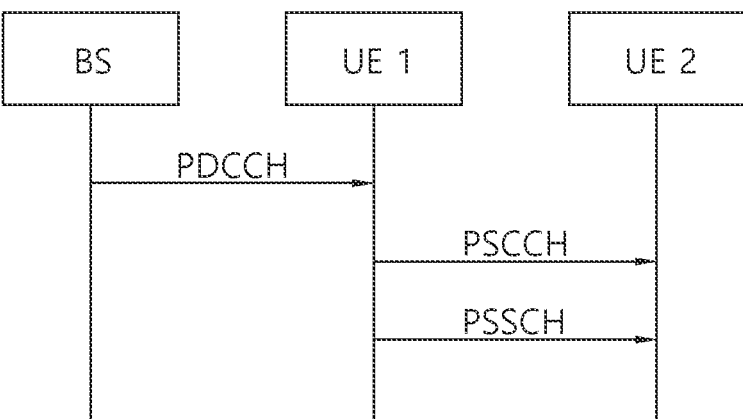
FIGS. 8a and 8b illustrate an example of a procedure of performing V2X or SL communication by a UE based on a transmission mode to which the implementation of the present disclosure is applied.
Figure 8B:
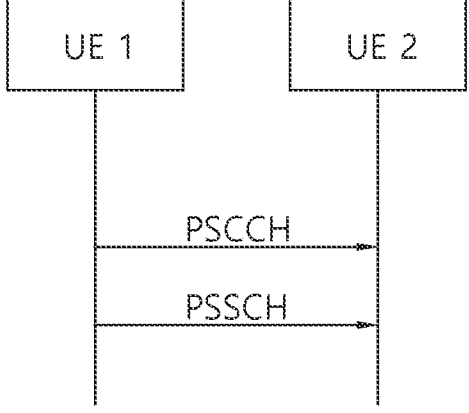

FIGS. 8a and 8b illustrate an example of a procedure of performing V2X or SL communication by a UE based on a transmission mode to which the implementation of the present disclosure is applied.

FIG. 8a and FIG. 8b show a procedure of performing V2X or SL communication by a UE based on a transmission mode, in accordance with an embodiment of the present disclosure. The embodiment of FIG. 8a and FIG. 8b may be combined with various embodiments of the present disclosure. In various embodiments of the present disclosure, the transmission mode may be called a mode or a resource allocation mode. Hereinafter, for the convenience of explanation, in LTE, the transmission mode may be called an LTE transmission mode. In NR, the transmission mode may be called an NR resource allocation mode.

For example, FIG. 8a shows a UE operation related to an LTE transmission mode 1 or an LTE transmission mode 3. Alternatively, for example, FIG. 8a shows a UE operation related to an NR resource allocation mode 1. For example, the LTE transmission mode 1 may be applied to general SL communication, and the LTE transmission mode 3 may be applied to V2X communication.

For example, FIG. 8b shows a UE operation related to an LTE transmission mode 2 or an LTE transmission mode 4. Alternatively, for example, FIG. 8b shows a UE operation related to an NR resource allocation mode 2.

Referring to FIG. 8a, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 8b, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in units of subchannels. In addition, the UE 1 which has autonomously selected the resource within the resource pool may transmit the SCI to the UE 2 through a PSCCH, and thereafter may transmit data based on the SCI to the UE 2 through a PSSCH.

For reference, Table 3 below represents an example of an operating band used for V2X (or SL) communication.

TABLE 3

| Operating Band | V2X Operating Band | V2X UE transmit $F_{UL\_low}$-$F_{UL\_high}$ | V2X UE receive $F_{DL\_low}$-$F_{DL\_high}$ | Duplex Mode | Interface |
|---|---|---|---|---|---|
| 47 | 47 | 5855 MHz-5925 MHz | 5855 MHz-5925 MHz | HD(Half Duplex) | PC5 |
| 39 | 39 | 1880 MHz-1920 MHz | 1880 MHz-1920 MHz | TDD | PC5 and/or Uu |

In the case that an operating band 47 according to the example of Table 3 is used for E-UTRA V2X (or SL) communication, the operating band 47 may be referred to as B47. In the case that the operating band 47 according to the example of Table 3 is used for NR V2X (or SL) communication, the operating band 47 may be referred to as n47.

In the case that an operating band 39 according to the example of Table 3 is used for E-UTRA V2X (or SL) communication, the operating band 39 may be referred to as B39. In the case that the operating band 39 according to the example of Table 3 is used for NR V2X (or SL) communication, the operating band 39 may be referred to as n39.

For reference, at least one proposal scheme proposed according to various embodiments of the present disclosure may be applied to not only sidelink communication or V2X communication based on a PC5 interface or an SL interface (e.g., PSCCH, PSSCH. PSBCH, PSSS/SSSS, etc.), but also sidelink communication or V2X communication based on a Uu interface (e.g., PUSCH. PDSCH, PDCCH, PUCCH, etc.).

In the various embodiments of the present disclosure, a receiving operation of a UE may include a decoding operation and/or a receiving operation of a sidelink channel and/or a sidelink signal (e.g., PSCCH, PSSCH, PSFCH, PSBCH, PSSS/SSSS, etc.). In the various embodiments of the present disclosure, a transmitting operation of a UE may include a transmitting operation of a sidelink channel and/or a sidelink signal (e.g., PSCCH, PSSCH, PSFCH, PSBCH, PSSS/SSSS, etc.).

Meanwhile, in the various embodiments of the present disclosure, for example, for the convenience of description, a (physical) channel used for an RX UE to transmit at least one of the following information to a TX UE may be referred to as PSFCH.

SL HARQ feedback, SL CSI, SL (L1) RSRP

Meanwhile, in the various embodiments of the present disclosure, a Uu channel may include a UL channel and/or a DL channel. For example, the UL channel may include PUSCH, PUCCH, and the like. For example, the DL channel may include PDCCH, PDSCH, and the like. For example, an SL channel may include PSCCH, PSSCH, PSFCH, PSBCH, and the like.

II. Disclosures of the Present Specification

The disclosures described below in the present specification may be implemented in one or more combinations (e.g., a combination including at least one of the contents described below). Each of the drawings shows an embodiment of the present disclosure, but the embodiments of the drawing may be implemented in combination with each other.

The description of the method proposed in the disclosure of the present specification may be composed of a combination of one or more operations/configurations/steps described below. The following methods described below may be performed or used in combination or complementarity.

For reference, in the disclosure of the present specification, sidelink (SL), V2X, V2X sidelink (SL) may have the same meaning.

There may be terminals that support both Uu links and SL in the same license band. In other words, these terminals can perform both Uu and SL communications in the same license band. However, in the prior art, when such UEs perform UL and SL transmissions, the UL and SL transmissions interfere with each other. In various examples of the disclosures herein, examples of how UL and SL transmissions can operate without interfering with each other are proposed.

In order to support both Uu links and SL in the same license band, the behavior of the terminal may depend on the RF structure of the terminal. For example, depending on the RF structure of the terminal, time division multiplexing (TDM) or frequency division multiplexing (FDM) may be applied:

Single RF chain for transmission(Tx) (for example, if the terminal contains a single RF chain used for transmission). In this case, the terminal can support UL Tx and SL Tx based on the TDM method.

Separate RF chain for transmission (Tx) (for example, if the terminal includes a separate RF chain for Uu transmission and a separate RF chain for SL transmission). In this case, the terminal can support UL Tx and SL Tx based on the FDM method.

Examples of how a terminal performs UL and SL transmissions are described.

The following drawings are intended to illustrate specific embodiments of the present disclosure. The designations of specific devices or the designations of specific signals/messages/fields shown in the drawings are for illustrative purposes only, and the technical features of this specification are not limited to the specific designations used in the drawings below.

Figure 9:
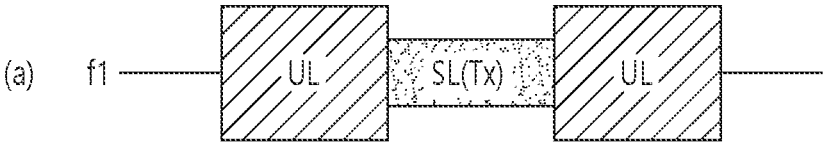
FIG. 9 illustrates an example of a terminal performing UL transmission and SL transmission according to one embodiment of the present disclosure.
Figure 9:
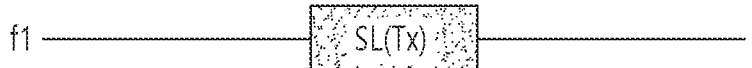
Figure 9:
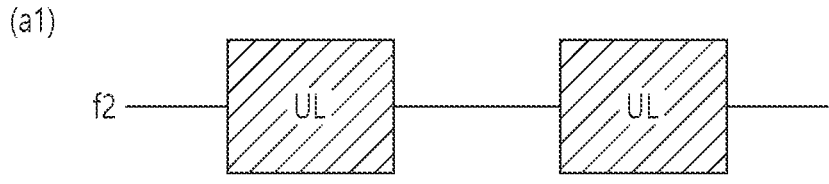
Figure 9:
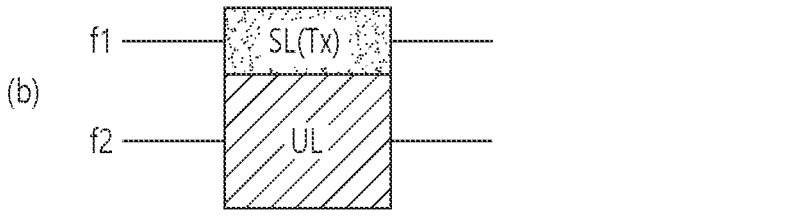
Figure 9:
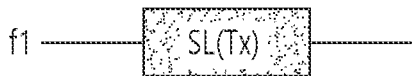
Figure 9:
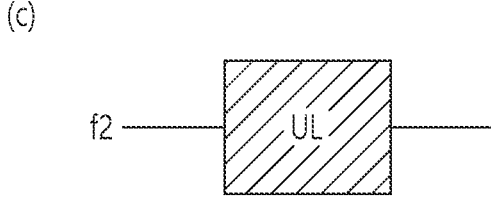

FIG. 9 illustrates an example of a terminal performing UL transmission and SL transmission according to one embodiment of the present disclosure.

The example in FIG. 9 shows an example of a UL transmission and SL transmission performed by a terminal.

In (a) of FIG. 9, for example, the carrier frequency of the UL and the carrier frequency of the SL may both be equal to f1. In this case, the terminal may transmit the UL signal and the SL signal based on the TDM method. For example, the terminal may perform UL transmission and SL transmission in a TDM manner.

In (a1) of FIG. 9, for example, the carrier frequency of the UL may be f1 and the carrier frequency of the SL may be f2. In this case, the terminal may transmit the UL signal and the SL signal based on the TDM method. For example, the terminal may perform UL transmission and SL transmission in a TDM manner. In this case, at the same time, the terminal may transmit only one of UL or SL.

In (b) of FIG. 9, for example, the carrier frequency of the UL and the carrier frequency of the SL may be different, and each channel may be adjacent in the frequency domain. In this case, the terminal may transmit the UL signal based on f2 and the SL signal based on f1, based on the FDM method. For example, the terminal may use f1 to transmit the SL signal and use f2 to transmit the UL signal based on the FDM method.

In (c) of FIG. 9, the carrier frequency of the UL and the carrier frequency of the SL are different, and each channel may not be adjacent. In this case, the terminal may transmit the UL signal based on f2 and the SL signal based on f1, based on the FDM method. For example, the terminal may use f1 to transmit the SL signal and f2 to transmit the UL signal based on the FDM method.

In the following, a specific example of the method according to (a) of FIG. 9 will be described.

1) Method (a)

Based on method (a), for example, the carrier frequency of the UL and the carrier frequency of the SL may both be equal to f1. In this case, the terminal may transmit UL and SL signals based on the TDM method.

According to the prior art, NTAoffset=0 was specified, assuming that the SL is used in a dedicated band. The value of NTAoffset=0 is the same for all cases where the SL synchronization reference source is an NR cell. GNSS and a neighboring terminal (SyncRef UE).

Within the same license band, there may exist terminals that can also support SL transmissions and Uu based on method (a). For such terminals, the following description may apply. Considering the intra-band con-current V2X operating bands of the license band partially used between SL and Uu, for example, as illustrated in the example of FIG. 10, if an SL SCS of 60 kHz is set, the current requirement $N_{TA\ soffset}=0$ for the NR cell as the synchronization reference source may not be applicable due to conflicting SL and UL symbols.

The following drawings are intended to illustrate specific embodiments of the present disclosure. The designations of specific devices or the designations of specific signals/messages/fields shown in the drawings are for illustrative purposes only, and the technical features of this specification are not limited to the specific designations used in the drawings below.

Figure 10:
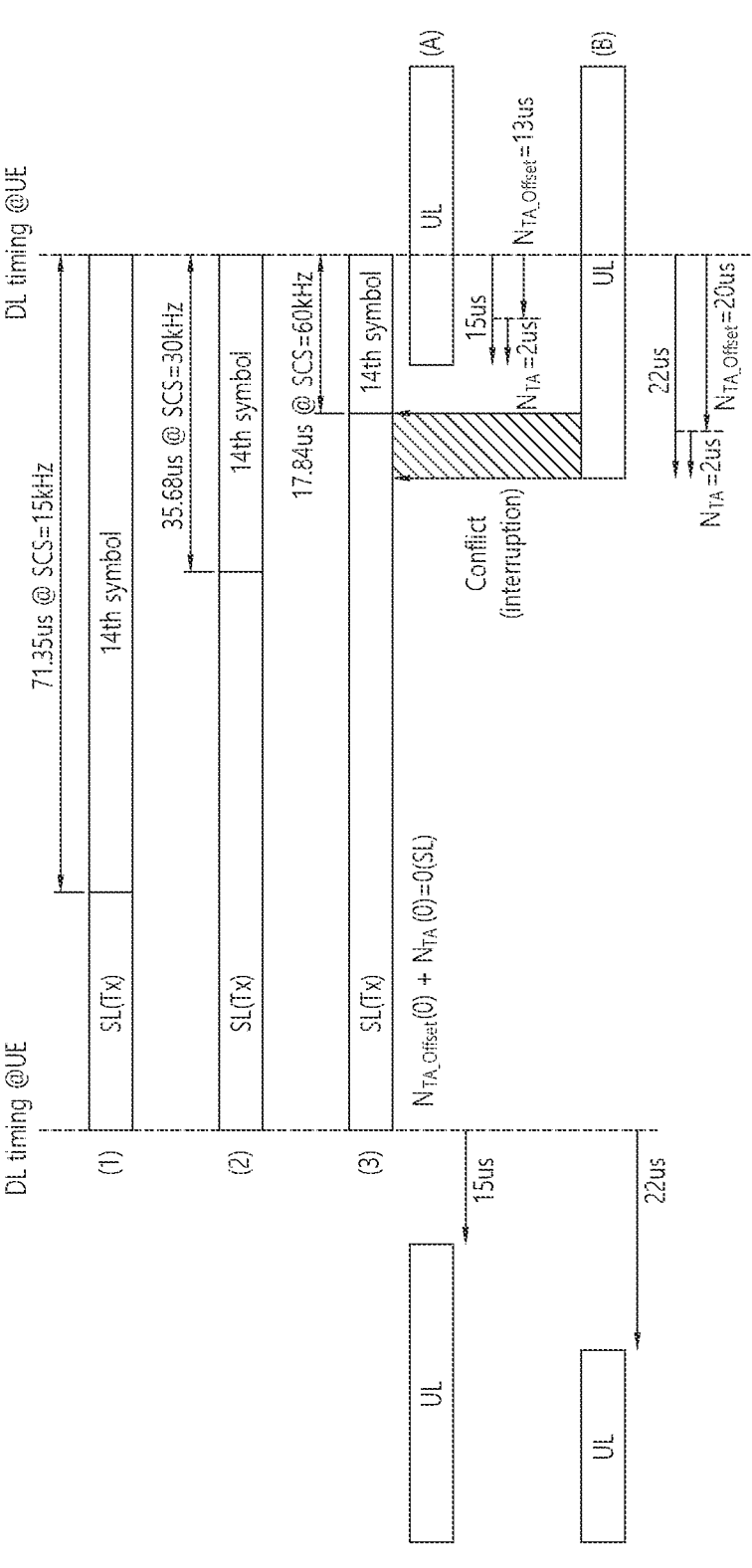
FIG. 10 illustrates a first example of operations when TA is applied to sidelink communication.

FIG. 10 illustrates a first example of operations when TA is applied to sidelink communication.

FIG. 10 shows an example of intra-band con-current V2X operating bands in the licensed band w % ben SL $N_{TAoffset}=0$.

Referring to the example in FIG. 10, (1) represents a case where the SCS is 15 kHz, (2) represents a case where the SCS is 30 kHz, and (3) represents a case where the SCS is 60 kHz. In the example of FIG. 10, SL $N_{TAoffset}$ may be 0.

In the example of FIG. 10, (1), (2), and (3) represent examples when the SCS for SL transmission is 15 kHz, 30 kHz, and 60 kHz, respectively, and $N_{TAoffset}=0$.

In the example of FIGS. 10, (A) and (B) represent examples of UL transmission performed when the $N_{TAoffset}$ is 3 us and when the $N_{TAoffset}$ is 5 us, respectively. Here, 3 us may mean 25600 Tc and 15 us may mean 39936 Tc according to the examples in Table 4. The DL propagation delay can be assumed to be 1 us. Where, $N_{TA}=2*Tprop$, cell radius=300 m. Tprop can mean DL propagation delay time.

TABLE 4

| Frequency range and band of cell used for uplink transmission | $N_{TAoffset}$ (Unit: $T_C$) |
| --- | --- |
| FR1 FDD or TDD band with neither E-UTRA-NR nor NB-IoT-NR coexistence case | 25600 (Note 1) (13 us) |
| FR1 FDD band with E-UTRA-NR and/or NB-IoT-NR coexistence case | 0 (Note 1) |
| FR1 TDD band with E-UTRA-NR and/or NB-IoT-NR coexistence case | 39936 (Note 1) (20 us) |
| FR2 | 13792 |

Note 1: The UE may identify the $N_{TAoffset}$ based on the TA offset related information (e.g. n-TimingAdvanceOffset). If the UE is not provided with TA offset related information (e.g. n-TimingAdvanceOffset), the default value of $N_{TAoffset}$ may be set to 25600 for the FR1 band. If multiple UL carriers exist within the same TA group (TAG), the UE may expect the same value of n-TimingAdvanceOffset to be provided for all UL carriers, and the $N_{TAoffset}$ value of 39936 may also be provided for the FDD serving cell.

Note that the UE may receive TA offset related information (e.g. n-TimingAdvanceOffset) from the base station.

In the example in Table 4, for the license band for the Intra-band con-current V2X operating band, the $N_{TAoffset}$ for UL transmission may be 3 us if only NR is used. In this case, for all SL SCSs in FR1, there is no collision between SL Tx symbols and UL symbols at the transition time from SL transmission to UL transmission, because the 14th symbol in the SL slot is always punctured, as shown in the example of FIG. 10.

On the other hand, in the example in Table 4, for the license band for intra-band con-current V2X operation, if both NR and E-UTRA are used, the NTAoffset for UL transmission may be 20 us. In this case, referring to the example in FIG. 10, for an SL SCS of 60 kHz at FR1, a collision between the SL Tx symbol and the UL symbol may occur at the transition point from SL transmission to UL transmission. Note that for SL SCS of 15 kHz and SL SCS of 30 kHz at FR1, there is no collision between the SL Tx symbol and the UL symbol.

One way to avoid conflicts (e.g., method 1) may be to disallow SL SCS of 60 kHz for intra-band con-current V2X operation in license bands where NR and E-UTRA coexist.

Another way to avoid conflicts (e.g., Method 2) may be to apply the same $N_{TAoffset}$ of 3 us (or 20 us) for the SL as for the UL. The examples of FIG. 11$a$ and FIG. 11$b$ below illustrate an example of how to set the $N_{TAoffset}$ of the SL to be the same as the $N_{TAoffset}$ of the UL.

The following drawings are intended to illustrate specific embodiments of the present disclosure. The designations of specific devices or the designations of specific signals/ messages/fields shown in the drawings are for illustrative purposes only, and the technical features of this specification are not limited to the specific designations used in the drawings below.

Figure 11A:
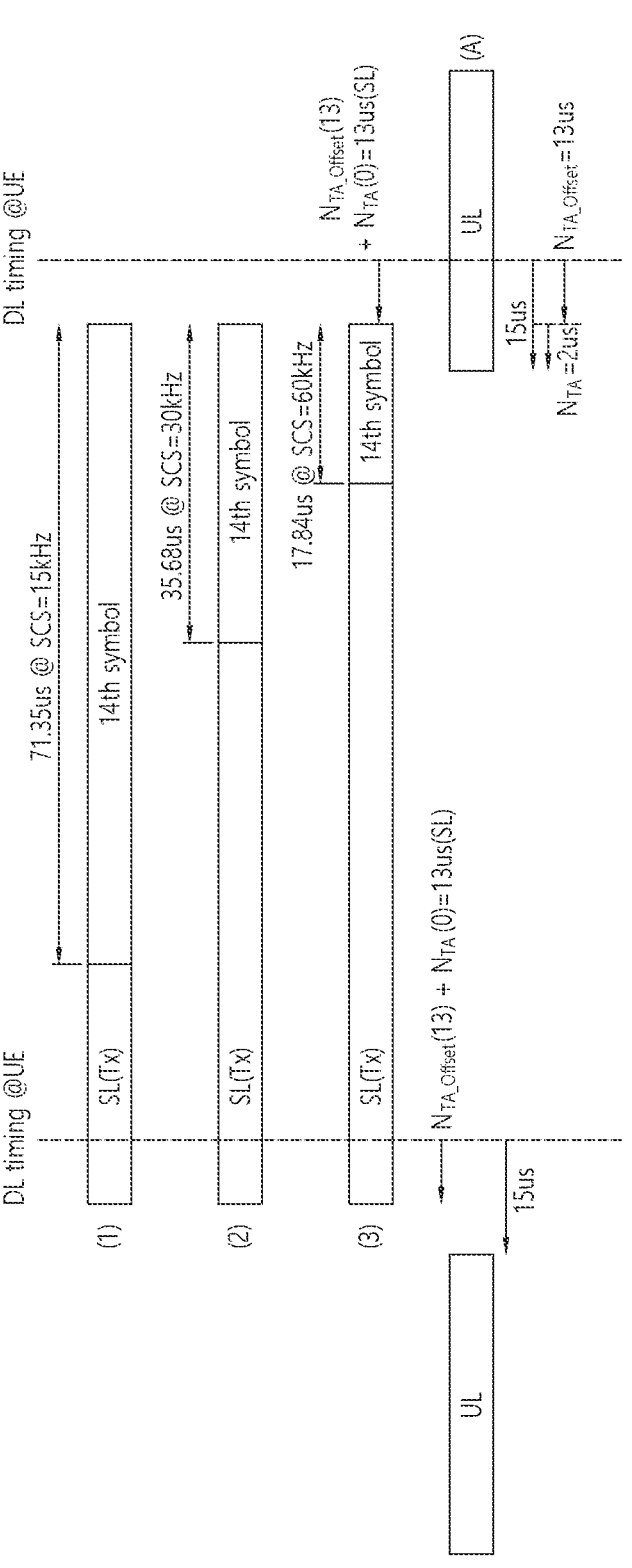
FIGS. 11a and 11b illustrate an example of setting the TA offset of sidelink communication equal to the TA offset of UL.
Figure 11B:
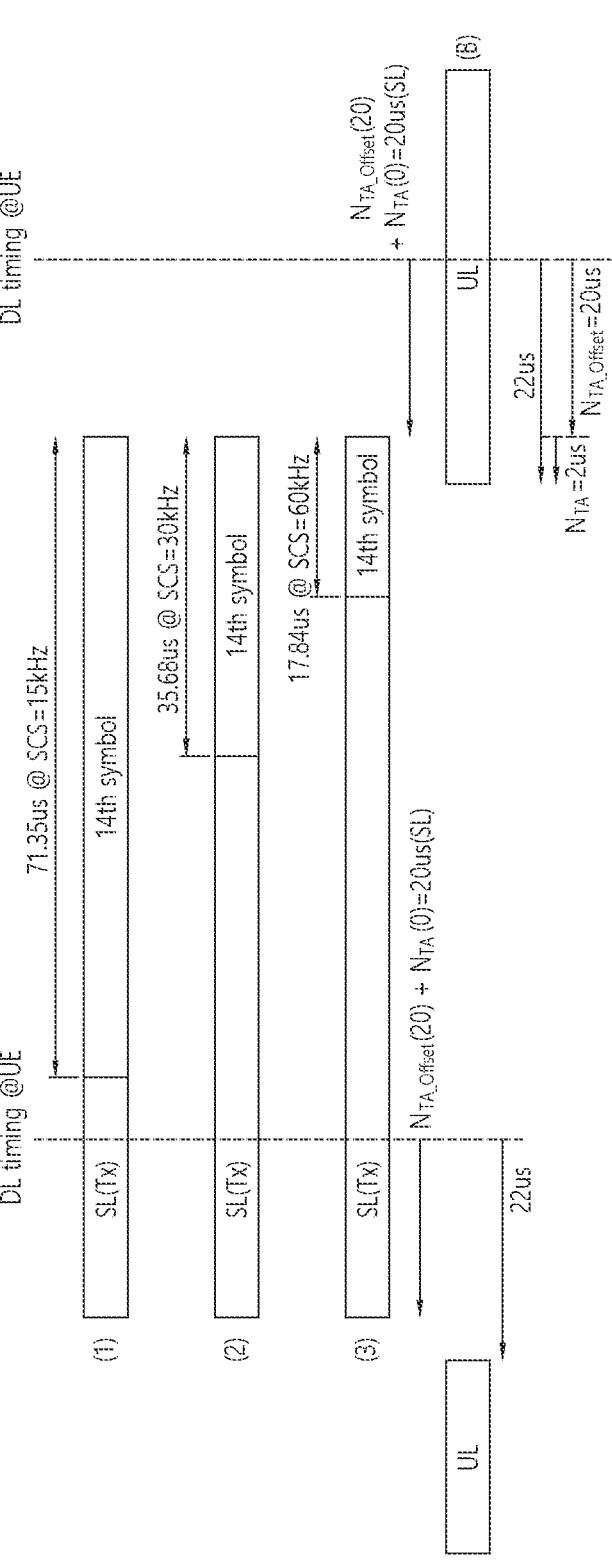
Figure 12A:
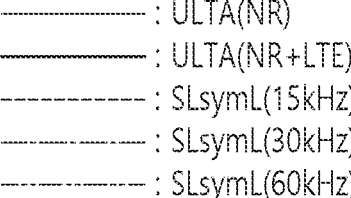
Figure 12A:
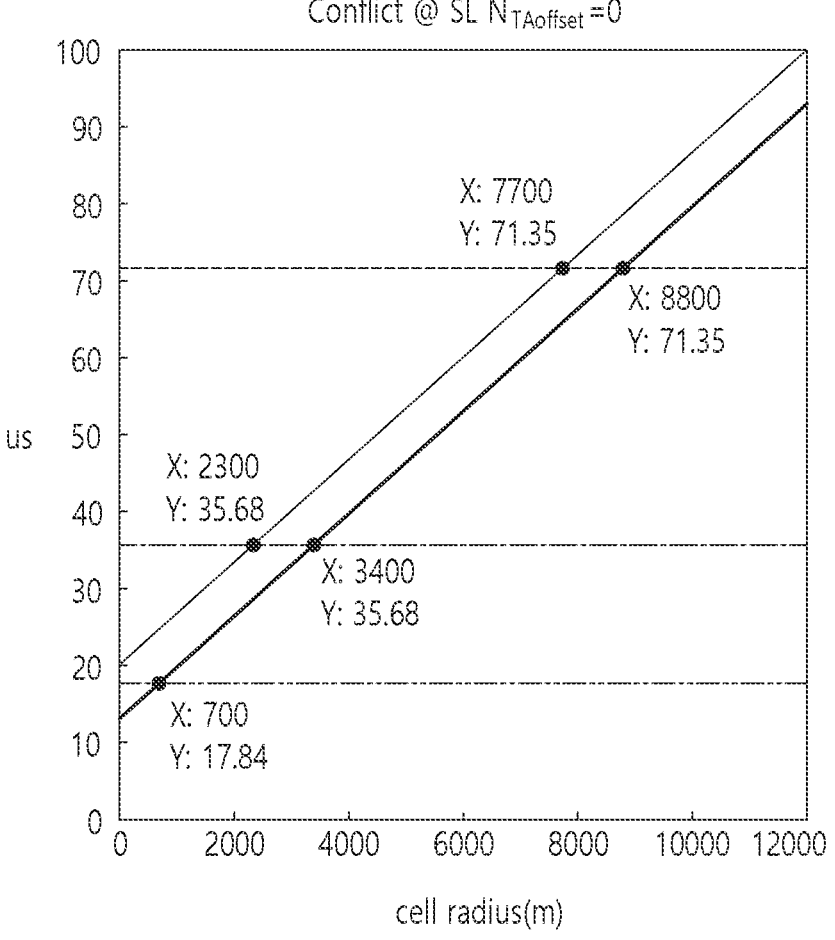
Figure 12C:
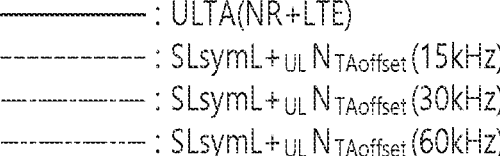
Figure 12C:
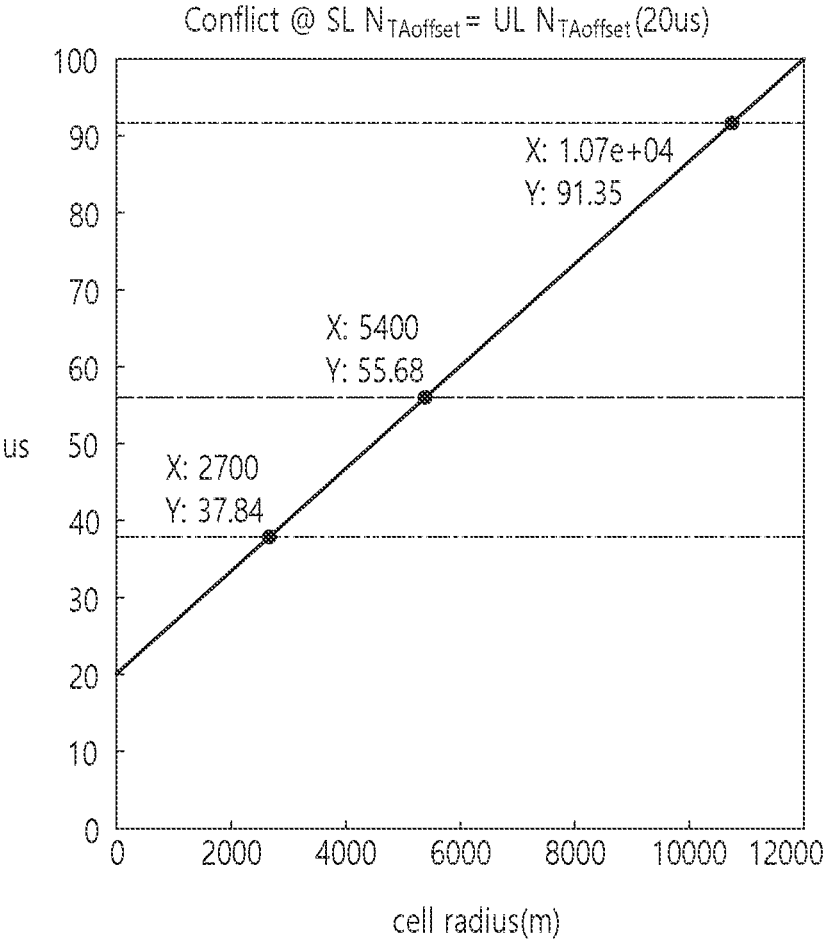

FIGS. 11$a$ and 11$b$ illustrate an example of setting the TA offset of sidelink communication equal to the TA offset of UL.

The examples in FIG. 11$a$ and FIG. 11$b$ show an example of an intra-band con-current V2X operating band in the license band when SL $N_{TAoffset}$=UL $N_{TAoffset}$.

Referring to FIG. 11$a$, an example of setting the $N_{TAoffset}$ of the SL to 13 us when the $N_{TAoffset}$ of the UL is 3 us is shown. Referring to FIG. 11$a$, unlike the example of FIG. 10, no collision occurs.

Referring to FIG. 11$b$, an example is shown where the $N_{TAoffset}$ of the SL is set to 20 us when the $N_{TAoffset}$ of the UL is 20 us. Referring to FIG. 11$b$, unlike the example of FIG. 10, no collision occurs.

However, the aforementioned method 1 and method 2 may only be applicable in the limited case of small cell radius. For example, if the cell radius is extended to 9 kilometers, the $N_{TA}$ for UL transmission may be 60 us. This is because $N_{TA}$ is 2*Tprop, and as the cell radius increases, Tprop increases. For example, if the cell radius is 9 kilometers, Tprop can be calculated as cell radius/speed of propagation. Here, the propagation speed is equal to the speed of light, and Tprop=9*1000/(3*10^8)=30 us.

For example, if the cell radius becomes larger, resulting in a larger $N_{TA}$ (e.g., $N_{TA}$ is 60 us), the following explanation may apply:

i) For all SL SCSs, method 1 cannot avoid collisions due to UL transmission timing because UL $N_{TAoffset}$ (13 us or 15 us)+$N_{TA}$ (60 us)>SL 14$^{th}$ symbol length.

ii) For SL SCS at 15 kHz and SL SCS at 30 kHz, method 2 cannot avoid collisions if, for example, UL $N_{TA}$ (60 us)>SL 14$^{th}$ symbol length.

To summarize the above, here's an example:

i) If SL $N_{TAoffset}$=0:

i-1) if UL $N_{TAoffset}$+$N_{TA}$>SL 14th symbol length: Conflict i-2) Otherwise: Non-conflict ii) If SL $N_{TAoffset}$=UL $N_{TAoffset}$:

ii-1) if UL $N_{TAoffset}$+$N_{TA}$>SL $N_{TAoffset}$+SL 14$^{th}$ symbol length (i.e., $N_{TA}$>SL 14$^{th}$ symbol length): Conflict ii-2) Otherwise: Non-conflict Here, for each of the cases where SL SCS is 15 kHz, 30 kHz, and 60 kHz, the length of the 14th symbol in the SL slot can be 71.35 us, 35.68 us, and 17.84 us, respectively.

The examples of FIGS. 12$a$ through 12$c$ illustrate the conflicted point between the UL transmission timing and the SL transmission timing, depending on the SL SCS and cell radius, for both the case of SL $N_{TAoffset}$=0 and the case of SL $N_{TAoffset}$=UL $N_{TAoffset}$. A summary of the example conflicts as a function of SCS, $N_{TAoffset}$, and cell radius illustrated in the examples of FIGS. 12$a$ through 12$c$ is shown in the examples of Table 5.

The following drawings are intended to illustrate specific embodiments of the present disclosure. The designations of specific devices or the designations of specific signals/ messages/fields shown in the drawings are for illustrative purposes only, and the technical features of this specification are not limited to the specific designations used in the drawings below.

FIGS. 12$a$ to 12$c$ illustrate an example of a conflicted point in UL transmission and SL transmission.

For reference, in the examples of FIGS. 12$a$ through 12$c$, 71.35 us, 35.68 us, and 17.84 us may be the lengths of the 14th symbol in the SL slot for the cases where the SL SCS is 15 kHz, 30 kHz, and 60 kHz, respectively.

The example in FIG. 12$a$ shows an example when SL $N_{TAoffset}$=0. The lower dashed line shows $N_{TA}$+UL_$N_{TAoffset}$ based on cell radius size when UL $N_{TAoffset}$=3 us. The upper diagonal line shows $N_{TA}$+UL_$N_{TAoffset}$ based on the cell radius size when UL $N_{TAoffset}$=20 us. The top horizontal line may represent the SL symbol length when SL SCS is 15 kHz, the middle horizontal line may represent the SL symbol length when SL SCS is 30 kHz, and the bottom horizontal line may represent the SL symbol length when SL SCS is 60 kHz. With respect to each horizontal line, the area below the horizontal line in the upper diagonal and lower diagonal may represent a conflict-free zone.

For example, for the downward slant (UL $N_{TAoffset}$=13 us), there is no conflict up to 700 meters for SL SCS 60 kHz, 3400 meters for SL SCS 30 kHz, and 8800 meters for SL SCS 15 kHz. For the upper oblique line (UL $N_{TAoffset}$=20 us), a conflict occurs for SL SCS 60 kHz, a conflict occurs for SL SCS 30 kHz up to 2300 m, and a conflict does not occur for SL SCS 15 kHz up to 7700 m.

FIG. 12$b$ and FIG. 12$c$ show examples when SL $N_{TAoffset}$=UL $N_{TAoffset}$. The example in FIG. 12$b$ shows $N_{TA}$+UL_$N_{TAoffset}$ depending on radius size when UL $N_{TAoffset}$=13 us, and the example in FIG. 12$c$ shows NTA+UL_NTAoffset depending on cell radius size when UL NTAoffset=20 us.

The top horizontal line may represent the SL symbol length+UL_$N_{TAoffset}$ for an SL SCS of 15 kHz, the middle horizontal line may represent the SL symbol length+UL_ $N_{TAoffset}$ for an SL SCS of 30 kHz, and the bottom horizontal line may represent the SL symbol length+UL_$N_{TAoffset}$ for an SL SCS of 60 kHz. For each horizontal line, the area below the horizontal line may represent a conflict-free zone.

For example, according to the example in FIG. 12$b$, when UL $N_{TAoffset}$=13 us, there is no conflict up to 2700 meters for SL SCS 60 kHz, up to 5400 meters for SL SCS 30 kHz, and up to 10700 meters for SL SCS 15 kHz.

Table 5 below shows examples of collisions as described in FIGS. 10 through 12$c$.

TABLE 5

| SL | | No-conflict up to cell radius (m) SL SCS | | |
|---|---|---|---|---|
| $N_{TAoffset}$ | UL $N_{TAoffset}$ | 15 kHz | 30 kHz | 60 kHz |
| 0 us | 13 us(NR band only) | 8800 m | 3400 m | 700 m |
| | 20 us(NR band coexisted with LTE band) | 7700 m | 2300 m | Conflict |

TABLE 5-continued

| SL | | No-conflict up to cell radius (m) SL SCS | | |
|---|---|---|---|---|
| $N_{TAoffset}$ | UL $N_{TAoffset}$ | 15 kHz | 30 kHz | 60 kHz |
| 13 us | 13 us(NR band only) | 10700 m | 5400 m | 2700 m |
| 20 us | 20 us(NR band coexisted with LTE band) | 10700 m | 5400 m | 2700 m |

The example in Table 5 summarizes the conflict between UL and SL transmissions.

For example, the examples in Table 5 may include examples w % ben the SL $N_{TAoffset}$ is zero and examples when the SL $N_{TAoffset}$ is the same as the UL $N_{TAoffset}$ (e.g., examples when the SL $N_{TAoffset}$ is 3 us and examples when the SL $N_{TAoffset}$ is 20 us).

Referring to the example in Table 5, the maximum cell radius without collisions is shown, depending on the combination of SL SCS, SL $N_{TAoffset}$, and UL $N_{TAoffset}$.

For example, if the SL $N_{TAoffset}$ is 0, and the UL $N_{TAoffset}$ is 3 us, when the SL SCS is 30 kHz, collisions may not occur up to 2300 meters.

Example 1 of the proposal: When Uu and SL are supported in the same license band in the manner of (a), the SCS of SL may be used differently depending on the Uu cell size so that UL and SL transmissions can operate without interference with each other.

Example 2 of the proposal: When supporting Uu and SL in the same license band in the manner described in (a), the following description may be applied to ensure that UL and SL transmissions operate without interference with each other:

A) When SL NTAoffset=0 us:

A-1) When UL NTAoffset=3 us (w % ben only NR is present in the license band). In the example below, X1<X2<X3, for example, X1=700 meters, X2=3400 meters, and X3=8800 meters:

For SL SCS, 15 kHz, 30 kHz, and 60 kHz can all be enabled if the Uu cell size is equal to or less than X1.

For SL SCS, 15 kHz and 30 kHz may be enabled if the Uu cell size is less than or equal to X2. For SL SCS, 60 kHz may not be set.

For SL SCS, only 15 kHz may be enabled if the Uu cell size is less than or equal to X3. For SL SCS, 30 kHz and 60 kHz may not be set.

A-2) When UL NTAoffset=20 us (when NR and LTE (E-UTRA) coexist in the license band). In the example below, Y2<Y3, e.g., Y2=2300 meters, Y3=7700 meters:

SL SCS 60 kHz can be configured not to be used.

For SL SCS, only 15 kHz and 30 kHz can be enabled if the Uu cell size is less than or equal to Y2.

if the Uu cell size is less than or equal to Y3, only SL SCK 15 kHz can be enabled.

If SL NTAoffset=UL NTAoffset:

B-1) When UL NTAoffset=13 us (when only NR exists in the license band). In the example below, Z i<Z2<Z3, e.g., Z1=2700 meters, Z2=5400 meters, Z3=10700 meters:

For SL SCS, 15 kHz, 30 kHz, and 60 kHz can all be configured to be used if the Uu cell size is equal to or less than Z1.

For SL SCS, 15 kHz and 30 kHz can be configured to be used if the Uu cell size is less than or equal to Z2. For SL SCS, 60 kHz may not be set.

For SL SCS, only 15 kHz may be enabled if the Uu cell size is less than or equal to Z3. For SL SCS, 30 kHz and 60 kHz may not be set.

B-2) UL NTAoffset=20 us (when NR and LTE (E-UTRA) coexist in the license band). In the example below, Z1<Z2<Z3, e.g., Z1=2700 meters, Z2=5400 meters, Z3=10700 meters:

For SL SCS, 15 kHz, 30 kHz, and 60 kHz can all be enabled if the Uu cell size is equal to or less than Z1.

For SL SCS, 15 kHz and 30 kHz can be enabled if the −Uu cell size is less than or equal to Z2. For SL SCS, 60 kHz may not be set.

If the Uu cell size is less than or equal to Z3, only SL SCS 15 kHz may be enabled. For SL SCS, 30 kHz and 60 kHz may not be set.

Hereinafter, a specific example of a method according to (a1) of FIG. 9 will be described.

2) Method (a1)

The method according to (a1) described in the example of FIG. 9 may be applied. Method (a1) may be, for example, when the carrier frequencies of the UL and SL are f1 and f2. According to (a1), the UE may transmit UL and SL in TDM, i.e., the UE may transmit only one of the UL and SL signals at the same time.

According to method (a), UL transmission and SL transmission are performed on the same carrier frequency f1. Method (a1) differs from method (a) only by transmitting UL transmission and SL transmission at different frequencies (f1, f2), and both method (a1) and method (a) transmit only one signal, either UL signal or SL signal, at the same time. Therefore, the following examples of proposals can be applied to method (a1).

Example 1a of the proposal. If Uu and SL are supported in the same license band based on method (a1), then Example 1 of the proposal may apply equally.

Example 2a of the proposal: If Uu and SL are supported in the same license band based on method (a1), Example 2 of the proposal may apply equally.

Below, a specific example of a method according to (b) of FIG. 9 is described.

3) Method (b)

The method according to (b) described in the example of FIG. 9 may be applied. Method (b) may be a case in which that the UL and SL have different carrier frequencies and the respective channels are adjacent. According to method (b), the UE may use f1 to transmit the SL signal and f2 to transmit the UL signal in the FDM method.

Based on method (b), a terminal that supports Uu communication as well as SL transmission in the same license band may have a separate RF chain. Therefore, if such a terminal uses method (b), interference between UL and SL transmissions as in method (a) may not occur.

On the other hand, glitches may occur during the switching on/off operation of the SL RF transmit chain of the UE or the switching on/off operation of the SL RF receive chain. These glitches may cause interruptions in the UL transmission and DL reception of the Uu link.

For example, the greater the frequency of switching on/off of the SL RF transmit/receive chain of the UE, the greater the frequency of interruptions in the Uu link, which can lead to increased performance degradation. To avoid this, the number of switching on/offs of the SL RF transmit chain and/or the number of switching on/offs of the SL RF receive chain may be constrained. The constraint criteria to which this constraint is applied may be, for example, a criterion that limits the number of switching On/Offs of the SL RF transmit chain and/or the number of switching On/Offs of the SL RF receive chain such that the ACK/NACK loss of the Uu link is allowed to be Y (%) within a reference time (X ms). For example, X=10 s, Y=0.5%.

Hereinafter, a specific example of the method according to (c) of FIG. 9 will be described.

4) Method (c)

The method according to (c) described in the example of FIG. 9 may be applied. Method (c) may be, for example, when the UL and SL have different carrier frequencies and their respective channels are not adjacent. Based on the FDM scheme, the UE may use f1 to transmit the SL signal and f2 to transmit the UL signal.

Based on method (c), a terminal that supports Uu communication as well as SL transmission in the same license band may have a separate RF chain. Therefore, if such a terminal uses method (c), interference between UL and SL transmissions as in method (a) may not occur.

In case (c), the same as in case (b) described above, glitches may occur during the switching on/off operation of the SL RF transmit chain of the UE or during the switching on/off operation of the SL RF receive chain. These glitches may cause interruptions in the UL transmission and DL reception of the Uu link.

For example, the more often the SL RF transmit/receive chain switches on and off, the more often interruptions occur on the Uu link, which can lead to increased performance degradation. To avoid this, the number of switching on/offs of the SL RF transmit chain and/or the number of switching on/offs of the SL RF receive chain may be constrained. The constraint criterion to which this constraint is applied may be, for example, a criterion that limits the number of switching On/Offs of the SL RF transmit chain and/or the number of switching On/Offs of the SL RF receive chain such that the ACK/NACK loss of the Uu link is allowed to be up to Y (%) within a reference time (X ms). For example, Y=0.5%.

Example 3 of the proposal: If Uu and SL are supported in the license band, as in the various examples described above, the network may set the SL configuration for the terminal and provide SL configuration information. In this case, the network may set the SL SCS, taking into account the cell size.

Example 4 of the proposal: If Uu and SL are supported in a license band, as in the various examples described above, the network may not set the SL configuration and SL communication may operate in a pre-configured manner. In this case, the network may provide information to the terminal regarding the size of the cell. Based on the information about the cell size, the terminal may set the SL SCS corresponding to the cell size.

Example 5 of the proposal: If Uu and SL are supported in the license band, as in the various examples described above, the network may establish an SL configuration for the terminal and provide SL configuration information. In this case, as in Example 2 of the proposal, it is proposed that the network configures the SL SCS, based on using the in-cell location information of the terminal. For example, the network may set the SL SCS according to a plurality of areas based on the location information of the terminal. Here, the in-cell location information of the terminal may be information indicating a location of the terminal within a cell, and the in-cell location information of the terminal may be synonymous with the location information of the terminal.

For example, if SL NTAoffset=0 us, then the network can demarcate multiple zones (X1<X2<X3) with ~X1, X1~X2, X2~X3.

For example, if SL NTAoffset=UL NTAoffset, then the network can demarcate multiple zones (Y2<Y3) with ~Y2, Y2~Y3.

Example 6 of the proposal: If Uu and SL are supported in a license band, as in the various examples described above, the network may not set the SL configuration and SL communications may operate in a pre-configured manner. In this case, the terminal may use its in-cell location information to configure SL SCS as in the second example of the proposal. For example, the terminal may configure the SL SCS according to a plurality of areas based on the terminal's location information.

For example, when SL NTAoffset=0 us, the terminal may distinguish a plurality of regions (X1<X2<X3) by ~X1, X-X2, X2-X3.

For example, when SL NTAoffset=UL NTAoffset, the terminal may distinguish a plurality of regions (Y2<Y3) by ~Y2, Y2-Y3.

Hereinafter, with reference to FIGS. 13 to 17, an example of a behavior of a UE and an example of a behavior of a network (e.g., a cell such as a gNB, eNB) will be described.

The following drawings are intended to illustrate specific embodiments of the present disclosure. The designations of specific devices or the designations of specific signals/messages/fields shown in the drawings are for illustrative purposes only, and the technical features of this specification are not limited to the specific designations used in the drawings below.

Figure 13:
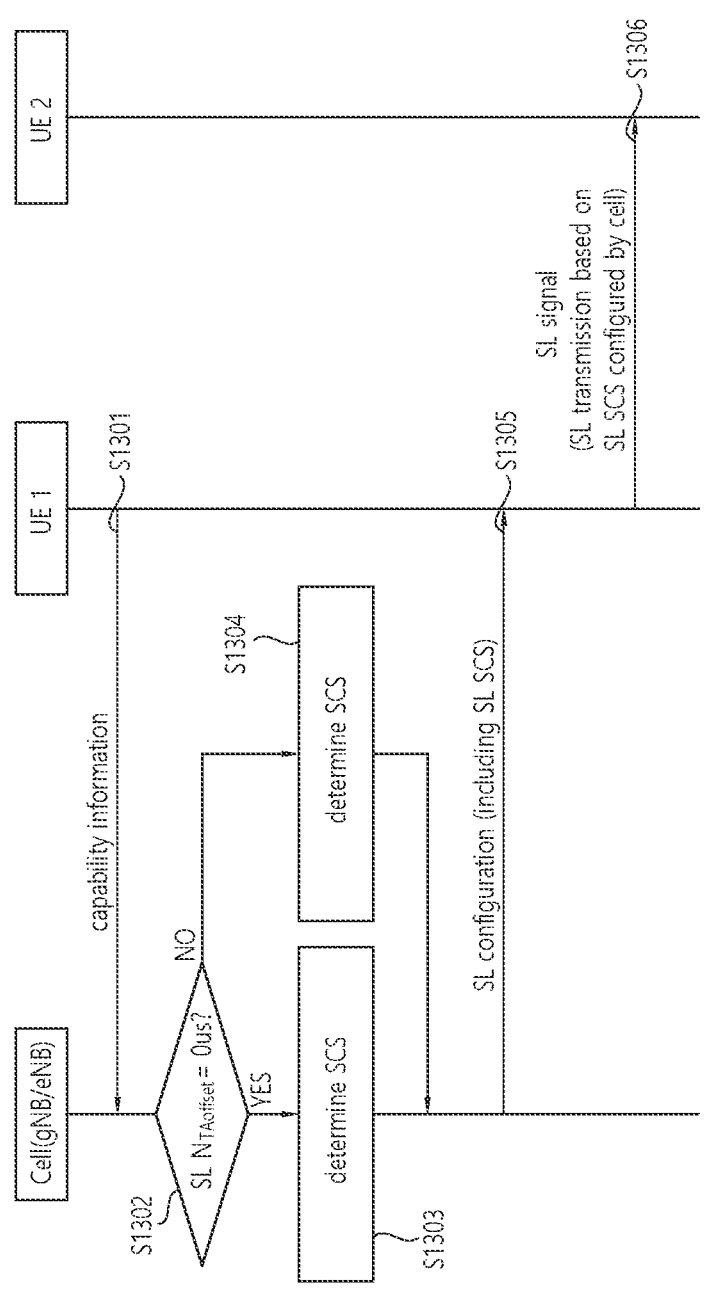
FIG. 13 illustrates a first example of operation of a network and/or operation of a terminal according to one embodiment of the present disclosure.

FIG. 13 illustrates a first example of operation of a network and/or operation of a terminal according to one embodiment of the present disclosure.

The operations of the network and/or the operations of the terminal depicted in the example of FIG. 13 are illustrative only. The operations performed by the network and/or the operations performed by the terminal are not limited by the example of FIG. 13, and each of the operations described in the various examples of the disclosure may be performed by the network and/or the terminal, even if not shown in the example of FIG. 13.

In step S1301, the UE1 may transmit the capability information to the cell (e.g., gNB/eNB). Note that herein, network may refer to a cell (e.g., gNB/eNB). The capability information may be, for example, information that the UE1 supports both SL and Uu communications in a single license band based on the TDM scheme.

At step S1302, the network may determine whether the SL $N_{TAoffset}$ is 0 us.

The SL $N_{TAoffset}$ can be set to 0 us or UL $N_{TAoffset}$. For example, if the frequency band used for SL communication is 'n47', which is an ITS band, the SL NTAoffset may be '0 us'. If the frequency band used for SL communication is a license band and SL communication is used together with Uu communication, the SL $N_{TAoffset}$ may be UL $N_{TAoffset}$. Here, if only SL communication is used in the license band, SL $N_{TAoffset}$ may be '0 us'.

For example, the network may determine that the SL $N_{TAoffset}$ is 0 us if the frequency band used for SL communications is the n47 band, which is an ITS band. For example, if the frequency band used for SL communications is a licensed band and SL communications are performed in conjunction with Uu communications, the network may determine that the SL $N_{TAoffset}$ is not 0 us and the SL $N_{TAoffset}$ is equal to the UL NTAoffset. For example, if the frequency band used for SL communications is a licensed band and only SL communications are performed, the network may determine that the SL $N_{TAoffset}$ is 0 us.

Note that the network can communicate the UL $N_{TAoffset}$ to the terminal. For example, the network may communicate the UL $N_{TAoffset}$ to the terminal via 'n-TimingAdvancedOffset' signaling.

If SL $N_{TAoffset}$ is set to 0 us, the network may perform step S1303. If SL $N_{TAoffset}$ is not set to 0 us, the network may perform step S1304.

Note that when the network sends the UL $N_{TAoffset}$ to the terminal, the terminal can determine the SL $N_{TAoffset}$ based on the operating band used for SL communication and whether Uu communication is also performed in the operating band. For example, as previously described, the SL $N_{TAoffset}$ may be set to 0 us or the UL $N_{TAoffset}$.

In step S1303 and/or step S1304, the network may determine the SL SCS of the terminal based on the cell size of the base station, the UL $N_{TAoffset}$, the SL $N_{TAoffset}$, and/or the SL SCS table (e.g., Table 5) that does not interfere with the UL.

For example, at step S1303, the network may perform the actions associated with "A) When SL NTAoffset=0 us" described above.

Specifically, an "A-1-related operation" and/or an "A-2-related operation" may be performed, as shown in the following example.

A-1) When UL NTAoffset=3 us (when only NR is present in the license band). In the example below, X1<X2<X3, for example, X1=700 meters, X2=3400 meters, and X3=8800 meters:

For SL SCS, 15 kHz, 30 kHz, and 60 kHz can all be configured to be used if the Uu cell radius (e.g., R) is less than or equal to X1.

For SL SCS, 15 kHz and 30 kHz may be configured to be used if the Uu cell radius (e.g., R) is less than or equal to X2. For SL SCS. 60 kHz may not be set.

For SL SCS, only 15 kHz may be configured to be used if the –Uu cell radius (e.g., R) is less than or equal to X3. For SL SCS, 30 kHz and 60 kHz may not be set.

A-2) When UL NTAoffset=20 us (when NR and LTE (E-UTRA) coexist in the license band). In the example below, Y2<Y3, e.g., Y2=2300 meters, Y3=7700 meters:

SL SCS 60 kHz can be configured to not be used.

If the Uu cell radius (e.g., R) is less than or equal to Y2, only 15 kHz and 30 kHz be configured to be used for SL SCS.

If the Uu cell radius (e.g., R) is less than or equal to Y3, only SL SCsS 15 kHz be configured to be used.

For example, at step S1304, the network may perform operations related to "B) If SL NTAoffset=UL NTAoffset" described above.

Specifically, a "B-1 related operations" and/or a "B-2 related operations" may be performed, as illustrated in the following examples:

B-1) When UL NTAoffset=13 us (when only NR exists in the license band). In the example below, Z1<Z2<Z3, e.g., Z1=2700 meters, Z2=5400 meters, Z3=10700 meters:

For SL SCS. 15 kHz. 30 kHz, and 60 kHz can all be enabled if the Uu cell radius (e.g., R) is less than or equal to Z1.

For SL SCS, 15 kHz and 30 kHz may be configured to be used if the Uu cell radius (e.g., R) is less than or equal to Z2. For SL SCS, 60 kHz may not be set.

For SL SCS, only 15 kHz may be configured to be used if the Uu cell radius (e.g., R) is less than or equal to Z3. For SL SCS, 30 kHz and 60 kHz may not be set.

B-2) A case in which UL NTAoffset=20 us (when NR and LTE (E-UTRA) coexist in the license band). In the example below, Z1<Z2<Z3, e.g., Z1=2700 meters, Z2=5400 meters, Z3=10700 meters:

For SL SCS, 15 kHz, 30 kHz, and 60 kHz can all be configured to be used if the Uu cell radius (e.g., R) is equal to or less than Z1.

For SL SCS, 15 kHz and 30 kHz may be configured to be used if the Uu cell radius (e.g., R) is less than or equal to Z2. For SL SCS, 60 kHz may not be set.

If the Uu cell radius (e.g., R) is less than or equal to Z3, only SL SCK 15 kHz may be configured to be used. For SL SCS, 30 kHz and 60 kHz may not be set.

In step S1305, the network may transmit SL configuration information to UE 1. The SL configuration may include information related to the SL SCS previously determined in step S1303 and/or step S1304.

In step S1306, UE 1 may perform the SL transmission based on the SL SCS established by the cell. For example, UE 1 may transmit an SL signal to UE 2 based on the SL SCS configured by the cell.

The following drawings are intended to illustrate specific embodiments of the present disclosure. The designations of specific devices or the designations of specific signals/messages/fields shown in the drawings are for illustrative purposes only, and the technical features of this specification are not limited to the specific designations used in the drawings below.

Figure 14:
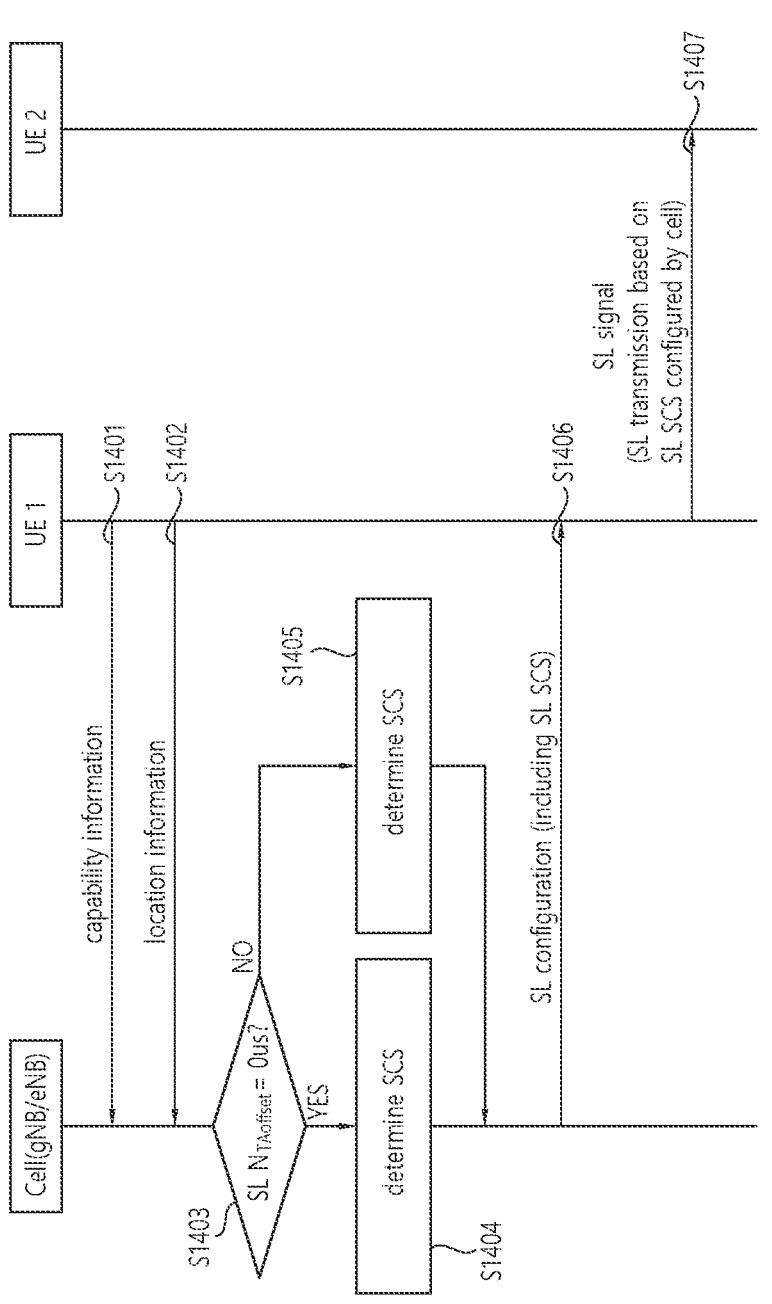
FIG. 14 illustrates a second example of operation of a network and/or operation of a terminal according to one embodiment of the present disclosure.

FIG. 14 illustrates a second example of operation of a network and/or operation of a terminal according to one embodiment of the present disclosure.

The operations of the network and/or the operations of the terminal depicted in the example of FIG. 14 are illustrative only. The operations performed by the network and/or the operations performed by the terminal are not limited by the example of FIG. 14, and each of the operations described in the various examples of the disclosure may be performed by the network and/or the terminal, even if not shown in the example of FIG. 14.

Step S1401 may be performed in the same manner as step S1301 of FIG. 13.

In step S1402, the UE1 may transmit information related to the location information of the terminal to the network. For example, the network may transmit a positioning reference signal (PRS) to the terminal to receive information related to the terminal's position. The terminal may then use the PRS to perform position-related measurements and report related data (e.g., reference signal time difference (RSTD), PRS-RSRP, UE Rx-Tx time difference, PRS-RSRPP) to the network. The network can then use these data to determine the location of the terminal. Based on the $N_{TA}$, the network may also utilize the distance information between the terminal and the base station as the location information of the terminal. For example, the network may receive Random Access Channel(s) (RACH) from UE1. Based on the received RACH, the network may determine the $N_{TA}$ information.

In step S1403, the network may determine whether the SL $N_{TAoffset}$ is 0 us. Step S1403 may be performed in the same manner as step S1302 of FIG. 13. If SL $N_{TAoffset}$ is set to 0 us, the network may perform step S1404. If SL $N_{TAoffset}$ is not set to 0 us, the network may perform step S1405.

In step S1404 and/or step S1405, the network may determine the SL SCS of the terminal based on the terminal's location information (e.g., distance between UE1 and the base station), UL $N_{TAoffset}$, SL $N_{TAoffset}$, and/or a table (e.g., Table 5) of SL SCSs that do not interfere with the UL.

For example, at step S1303, the network may perform the actions associated with "A) When SL NTAoffset=0 us" described above.

Specifically, an "A-1 related action" and/or an "A-2 related action" may be performed, as shown in the following example.

A-1) When UL NTAoffset=3 us (when only NR is present in the license band). In the example below, X1<X2<X3, for example, X1=700 meters, X2=3400 meters, and X3=8800 meters:

For SL SCS, 15 kHz, 30 kHz and 60 kHz may all be configured to be used if the distance between the UE and base station (e.g., R) is less than or equal to X1.

For SL SCS, 15 kHz and 30 kHz may be configured to be used if the distance between the UE and the base station (e.g. R) is less than or equal to X2. For SL SCS, 60 kHz may not be set.

For SL SCS, only 15 kHz may be configured to be used if the distance between the UE and the base station (e.g. R) is less than or equal to X3. For SL SCS, 30 kHz and 60 kHz may not be set.

A-2) When UL NTAoffset=20 us (when NR and LTE (E-UTRA) coexist in the license band). In the example below, Y2<Y3, e.g., Y2=2300 meters, Y3=7700 meters:

SL SCS 60 kHz can be configured to not be used.

For SL SCS, only 15 kHz and 30 kHz may be configured to be used if the distance between the UE and the base station (e.g., R) is less than or equal to Y2.

If the distance between the UE and the base station (e.g., R) is less than or equal to Y3, only SL SCK 15 kHz may be configured to be used.

For example, at step S1304, the network may perform operations related to "B) If SL NTAoffset=UL NTAoffset" described above.

Specifically, a "B-1 related operations" and/or a "B-2 related operations" may be performed, as illustrated in the following examples:

B-1) When UL NTAoffset=13 us (when only NR exists in the license band). In the example below, Z1<Z2<Z3, e.g., Z1=2700 meters, Z2=5400 meters, Z3=10700 meters:

For SL SCS, 15 kHz, 30 kHz and 60 kHz may all be enabled if the distance between the UE and base station (e.g. R) is less than or equal to Z1.

For SL SCS, 15 kHz and 30 kHz may be configured to be used if the distance between the UE and the base station (e.g. R) is less than or equal to Z2. For SL SCS, 60 kHz may not be set.

For SL SCS, only 15 kHz may be configured to be used if the distance between the UE and the base station (e.g. R) is less than or equal to Z3. For SL SCS, 30 kHz and 60 kHz may not be set.

B-2) A case in which UL $N_{TAoffset}$=20 us (when NR and LTE (E-UTRA) coexist in the license band). In the example below, Z1<Z2<Z3, e.g., Z1=2700 meters, Z2=5400 meters, Z3=10700 meters:

For SL SCS, 15 kHz, 30 kHz and 60 kHz may all be enabled if the distance between the UE and base station (e.g. R) is equal to or less than Z1.

For SL SCS, 15 kHz and 30 kHz may be enabled if the distance between the UE and the base station (e.g. R) is less than or equal to Z2. For SL SCS, 60 kHz may not be set.

If the distance between the UE and the base station (e.g., R) is less than or equal to Z3, only SL SCS 15 kHz may be configured to be used. For SL SCS, 30 kHz and 60 kHz may not be set.

Step S1406 may be performed in the same manner as step S1305 in FIG. 13.

Step S1407 may be performed in the same manner as step S1306 in FIG. 13.

The following drawings are intended to illustrate specific embodiments of the present disclosure. The designations of specific devices or the designations of specific signals/messages/fields shown in the drawings are for illustrative purposes only, and the technical features of this specification are not limited to the specific designations used in the drawings below.

Figure 15:
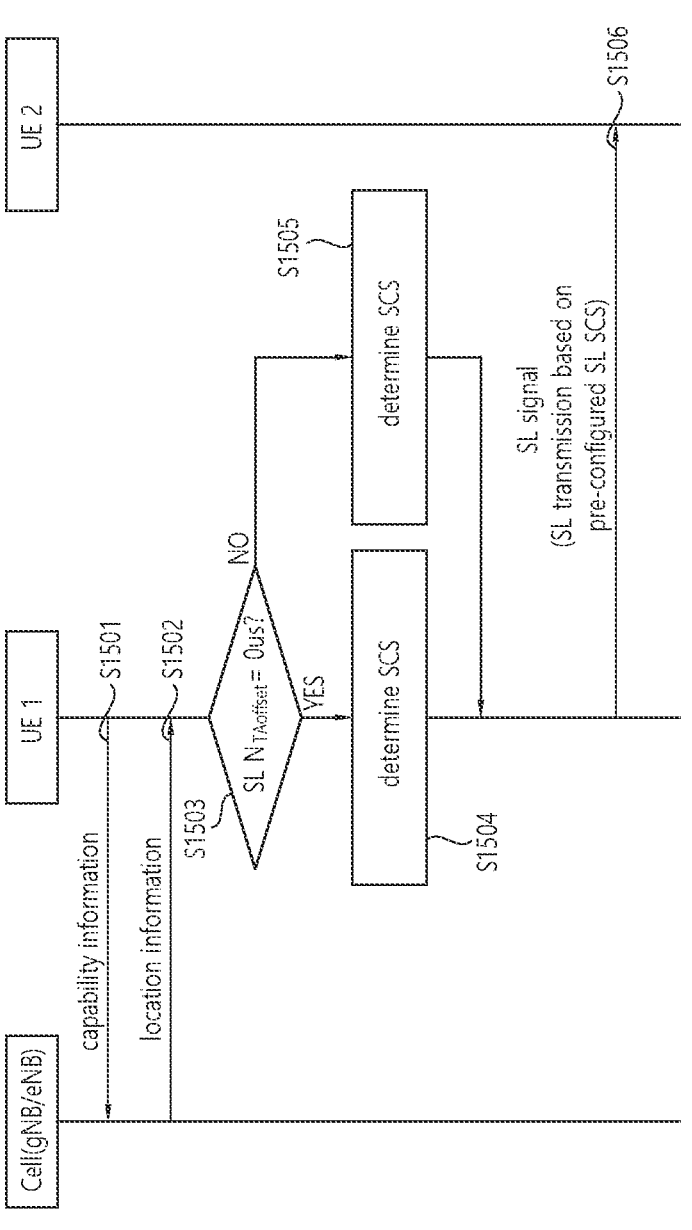
FIG. 15 illustrates a third example of operation of a network and/or operation of a terminal according to one embodiment of the present disclosure.

FIG. 15 illustrates a third example of operation of a network and/or operation of a terminal according to one embodiment of the present disclosure.

The operations of the network and/or the operations of the terminal depicted in the example of FIG. 15 are illustrative only. The operations performed by the network and/or the operations performed by the terminal are not limited by the example of FIG. 15, and each of the operations described in the various examples of the disclosure may be performed by the network and/or the terminal, even if not shown in the example of FIG. 15.

Step S1501 may be performed in the same manner as step S1301 of FIG. 13.

In step S1502, the network may transmit the cell size information of the base station to the UE1.

In step S1503, the UE1 may determine whether the SL $N_{TAoffset}$ is 0 us. Step S1503 may be performed in the same manner as step S1302 of FIG. 13. If SL $N_{TAoffset}$ is set to 0 us, the UE1 may perform step S1504. If SL $N_{TAoffset}$ is not set to 0 us, UE1 may perform step S1505.

In step S1504 and/or step S1505, the UE 1 may determine the SL SCS based on the cell size of the base station, the UL $N_{TAoffset}$, the SL $N_{TAoffset}$, and/or the SL SCS table (e.g., Table 5) that does not interfere with the UL.

For example, in step S1504, UE 1 may perform an action related to "A) When SL NTAoffset=0 us" described above.

Specifically, an "A-1-related operations" and/or an "A-2-related operations ss" may be performed, as shown in the following example.

A-1) When UL NTAoffset=3 us (when only NR is present in the license band). In the example below, X1<X2<X3, for example, X1=700 meters, X2=3400 meters, and X3=8800 meters:

For SL SCS, 15 kHz, 30 kHz, and 60 kHz can all be configured to be used if the Uu cell radius (e.g., R) is less than or equal to X1.

For SL SCS, 15 kHz and 30 kHz may be configured to be used if the Uu cell radius (e.g., R) is less than or equal to X2. For SL SCS, 60 kHz may not be set.

For SL SCS, only 15 kHz may be configured to be used if the Uu cell radius (e.g., R) is less than or equal to X3. For SL SCS, 30 kHz and 60 kHz may not be set.

A-2) When UL NTAoffset=20 us (when NR and LTE (E-UTRA) coexist in the license band). In the example below, Y2<Y3, e.g., Y2=2300 meters, Y3=7700 meters:

SL SCS 60 kHz can be configured to not be used.

If the Uu cell radius (e.g., R) is less than or equal to Y2, only 15 kHz and 30 kHz can be configured to be used for SL SCS If the Uu cell radius (e.g., R) is less than or equal to Y3, only SL SCK 15 kHz can be configured to be used.

For example, in step S1505, UE 1 may perform actions related to "B) When SL NTAoffset=UL NTAoffset" described above.

Specifically, "B-1 related actions" and/or "B-2 related actions" may be performed, as illustrated by the following examples:

B-1) When UL NTAoffset=13 us (when only NR is present in the license band). In the example below, $Z1<Z2<Z3$, e.g., Z1=2700 meters, Z2=5400 meters, Z3=10700 meters:

For SL SCS, 15 kHz, 30 kHz, and 60 kHz can all be configured to be used if the Uu cell radius (e.g., R) is equal to or less than Z1.

For SL SCS. 15 kHz and 30 kHz can be configured to be used if the Uu cell radius (e.g., R) is equal to or less than Z2. For SL SCS, 60 kHz may not be set.

For SL SCS, only 15 kHz may be configured to be used if the Uu cell radius (e.g., R) is less than or equal to Z3. For SL SCS, 30 kHz and 60 kHz may not be set.

B-2) UL NTAoffset=20 us (when NR and LTE (E-UTRA) coexist in the license band). In the example below, $Z1<Z2<Z3$, e.g., Z1=2700 meters, Z2=5400 meters, Z3=10700 meters:

For SL SCS, 15 kHz, 30 kHz, and 60 kHz can all be configured to be used if the Uu cell radius (e.g., R) is equal to or less than Z1.

For SL SCS, 15 kHz and 30 kHz may be configured to be used if the Uu cell radius (e.g., R) is less than or equal to Z2. For SL SCS, 60 kHz may not be set.

If the Uu cell radius (e.g., R) is less than or equal to Z3, only SL SCK 15 kHz may be enabled. For SL SCS, 30 kHz and 60 kHz may not be set.

In step S1506, the UE 1 may perform the SL transmission based on the pre-configured SL SCS. Here, the pre-configured SL SCS may refer to the SCS determined in step S1504 and step S1505. For example, UE 1 may transmit an SL signal to UE 2 based on the pre-configured SL SCS.

The following drawings are intended to illustrate specific embodiments of the present disclosure. The designations of specific devices or the designations of specific signals/messages/fields shown in the drawings are for illustrative purposes only, and the technical features of this specification are not limited to the specific designations used in the drawings below.

Figure 16:
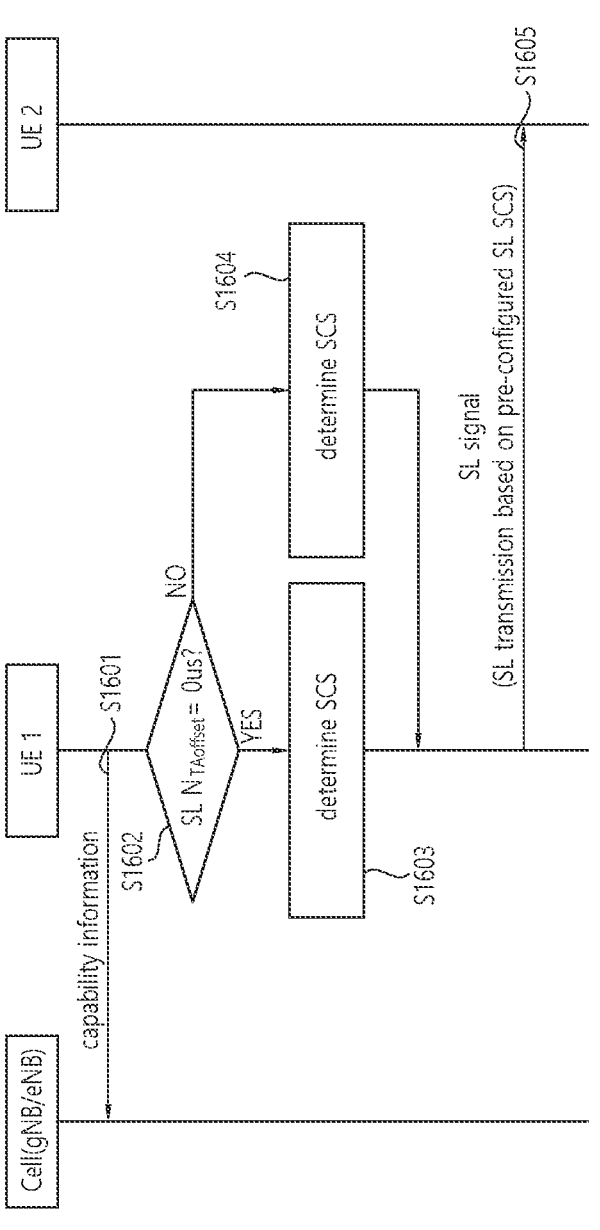
FIG. 16 illustrates a fourth example of operation of a network and/or operation of a terminal according to one embodiment of the present disclosure.

FIG. 16 illustrates a fourth example of operation of a network and/or operation of a terminal according to one embodiment of the present disclosure.

The operations of the network and/or the operations of the terminal depicted in the example of FIG. 16 are illustrative only. The operations performed by the network and/or the operations performed by the terminal are not limited by the example of FIG. 16, and each of the operations described in the various examples of the disclosure may be performed by the network and/or the terminal, even if not shown in the example of FIG. 16.

Step S1601 may be performed in the same manner as step S1301 of FIG. 13.

In step S1602, the UE1 may determine whether the SL $N_{TAoffset}$ is 0 us. Step S1602 may be performed in the same manner as step S1302 of FIG. 13. If SL $N_{TAoffset}$ is set to 0 us, the UE1 may perform step S1504. If SL $N_{TAoffset}$ is not set to 0 us, UE1 may perform step S1505.

In step S1603 and/or step S1604, the UE 1 may determine the SL SCS based on the cell size of the base station, the UL $N_{TAoffset}$, the SL $N_{TAoffset}$, and/or the SL SCS table (e.g., Table 5) that does not interfere with the UL.

For example, in step S1603, UE 1 may perform operations related to the previously described "A) When SL NTAoffset=0 us".

Specifically, an "A-1 related operations" and/or an "A-2 related operations" may be performed, as shown in the following example.

A-1) When UL NTAoffset=3 us (when only NR is present in the license band). In the example below, $X1<X2<X3$, for example, X1=700 meters, X2=3400 meters, and X3=8800 meters.

For SL SCS, 15 kHz, 30 kHz and 60 kHz may all be configured to be used if the distance between the UE and the base station (e.g., R) is less than or equal to XL.

For SL SCS, 15 kHz and 30 kHz may be configured to be used if the distance between the UE and the base station (e.g. R) is less than or equal to X2. For SL SCS, 60 kHz may not be set.

For SL SCS, only 15 kHz may be configured to be used if the distance between the UE and the base station (e.g. R) is less than or equal to X3. For SL SCS, 30 kHz and 60 kHz may not be set.

A-2) When UL NTAoffset=20 us (when NR and LTE (E-UTRA) coexist in the license band). In the example below, $Y2<Y3$, e.g., Y2=2300 meters, Y3=7700 meters:

SL SCS 60 kHz can be configured to not be used.

For SL SCS, only 15 kHz and 30 kHz may be configured to be used if the distance between the UE and the base station (e.g., R) is less than or equal to Y2.

If the distance between the UE and the base station (e.g., R) is less than or equal to Y3, only SL SCK 15 kHz may be configured to be used.

For example, in step S1604, UE 1 may perform an operations related to "B) If SL NTAoffset=UL NTAoffset" described above.

Specifically, a "B-1 related operations" and/or a "B-2 related operations" may be performed, as illustrated in the following examples:

B-1) When UL NTAoffset=13 us (when only NR exists in the license band). In the example below, $Z1<Z2<Z3$, e.g., Z1=2700 meters, Z2=5400 meters, Z3=10700 meters:

For SL SCS, 15 kHz, 30 kHz and 60 kHz may all be configured to be used if the distance between the UE and base station (e.g. R) is less than or equal to Z1.

For SL SCS, 15 kHz and 30 kHz may be configured to be used if the distance between the UE and the base station (e.g. R) is less than or equal to Z2. For SL SCS, 60 kHz may not be set.

For SL SCS, only 15 kHz may be configured to be used if the distance between the UE and the base station (e.g. R) is less than or equal to Z3. For SL SCS, 30 kHz and 60 kHz may not be configured.

B-2) UL NTAoffset=20 us (when NR and LTE (E-UTRA) coexist in the license band). In the example below, $Z1<Z2<Z3$, e.g., Z1=2700 meters, Z2=5400 meters. Z3=10700 meters:

For SL SCS, 15 kHz, 30 kHz and 60 kHz may all be configured to be used if the distance between the UE and base station (e.g. R) is equal to or less than Z1.

For SL SCS, 15 kHz and 30 kHz may be configured to be used if the distance between the UE and the base station (e.g. R) is less than or equal to Z2. For SL SCS, 60 kHz may not be set.

If the distance between the UE and the base station (e.g., R) is less than or equal to Z3, only SL SCK 15 kHz may be configured to be used. For SL SCS, 30 kHz and 60 kHz may not be set.

Step S1605 may be performed in the same manner as step S1506 of FIG. 15.

The following drawings are intended to illustrate specific embodiments of the present disclosure. The designations of specific devices or the designations of specific signals/messages/fields shown in the drawings are for illustrative purposes only, and the technical features of this specification are not limited to the specific designations used in the drawings below.

Hereinafter, reference will be made to FIG. 17 to illustrate the operation of the base station and/or the operation of the UE described in various examples throughout the disclosure herein.

Figure 17:
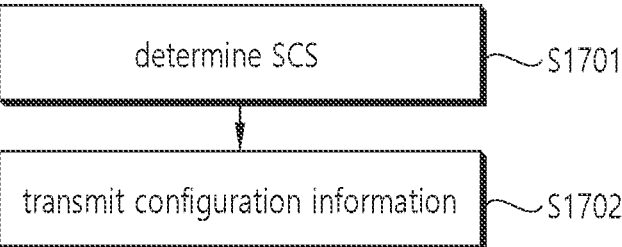
FIG. 17 illustrates an example of operation of a base station according to one embodiment of the present disclosure.

FIG. 17 illustrates an example of operation of a base station according to one embodiment of the present disclosure.

FIG. 17 illustrates an example of base station operation in accordance with one embodiment of the disclosure.

The operations illustrated in FIG. 17 are illustrative only, and the base station may perform various operations performed by the base station (e.g., gNB, eNB, or cell) in various examples of the disclosure.

In step S1701, the base station may determine the SCS. For example, the base station may determine the SCS for the SL based on the distance-related information, the TA offset for the UL, and the TA offset for the SL communication. Specifically, the base station may determine the SCS for the SL based on the distance-related information, the TA offset for the UL, the TA offset for the SL communication, and Table 5.

For example, step S1701 may include the operation of step S1302 to step S1304 of the example of FIG. 13. In one example, step S1701 may include an operation of step S1403 to step S1405 of the example of FIG. 14. In one example, step S1701 may include an operation of step S1503 to step S1505 of the example of FIG. 15. In one example, step S1701 may include an operation of step S1602 to step S1604 of the example of FIG. 16.

Of note, before step S1701 is performed, the base station may transmit the TA offset for the UL communication to the UE. As described in various examples throughout the disclosure, the TA offset for the SL communication may be set to be the same as the TA offset for the UL, or the TA offset for the SL communication may be set to 0 us.

Of note, before step S1701 is performed, any of the operations described in the example of FIG. 13 to the example of FIG. 16 may be performed. For example, before step S1701 is performed, step S1301 of FIG. 13 may be performed. In one example, before step S1701 is performed, step S1401 or step S1402 of FIG. 14 may be performed. In one example, before step S1701 is performed, steps S1501 to S1502 of FIG. 15 may be performed. In one example, before step S1701 is performed, step S1601 of FIG. 16 may be performed.

In step S1702, the base station may transmit setup information to the UE. For example, the base station may transmit SL configuration information to the UE, including information related to the SL SCS, in a manner such as step S1305 of FIG. 13 or step S1406 of FIG. 14.

The UE may transmit SL signaling to other UEs based on SL configuration information, including information related to the SL SCS.

Note that, as shown in the example of FIG. 17, the UE may receive SL setting information from the base station or may operate in a pre-configuration manner as described in the example of FIG. 15 and the example of FIG. 16. When operating in a pre-configuration manner, the UE may perform the operations described in the example of FIG. 15 and/or the example of FIG. 16.

As described in the disclosure herein with reference to various examples, NR SL time specifications for terminals that simultaneously transmit NR SL and NR Uu in a single license band may be clearly defined. For example, the base station and/or the terminal may determine the SCS for SL based on the cell size or the distance between the terminal and the cell. Accordingly, conflicts in NR SL signaling due to NR UL signaling transmitted by the terminal may be minimized. When the terminal performs UL transmission and SL transmission, the interference between the UL transmission and SL transmission may be minimized. As described in the disclosure herein with reference to various examples, the transmission of NR SL and NR UL may be performed efficiently and/or accurately. Accordingly, terminals that simultaneously transmit NR SL and NR Uu in a single license band may be introduced to the market.

For reference, the operation of the UE described in the present disclosure may be performed by the device shown in FIG. 1 to FIG. 3. For example, the UE may be the first wireless device 100 or the second wireless device 200 shown in FIG. 1. For example, the operation of the UE described in the present disclosure may be processed by one or more processors 102 or 202. The operation of the UE described in the present disclosure may be stored in one or more memories 104 or 204 in the form of instruction/program (e.g., instruction, executable code, etc.) executable by the one or more processors 102 or 202. The one or more processors 102 or 202 may control the one or more memories 104 or 204 and the one or more transceivers 105 or 206 and may perform the operation of the UE described in the present disclosure by executing the instruction/program stored in the one or more memories 104 or 204.

Furthermore, the instructions for performing the operation of the UE described in the present disclosure may be stored in a non-volatile computer readable storage medium. The storage medium may be included in the one or more memories 104 or 204. In addition, the instructions stored in the storage medium may be executed by the one or more processors 102 or 202, and the operation of the UE described in the present disclosure may be performed.

For reference, the operation of the BS (e.g., NG-RAN, gNB, eNB, RAN, cell, etc.) described in the present disclosure may be implemented by the device shown in FIG. 1 to FIG. 3. For example, the BS (e.g., NG-RAN, gNB, eNB, RAN, cell, etc.) may be the first wireless device 100a or the second wireless device 100b shown in FIG. 1. For example, the operation of the BS (e.g., NG-RAN, gNB, eNB, RAN, cell, etc.) described in the present disclosure may be processed by one or more processors 102 or 202. The operation of the UE described in the present disclosure may be stored in one or more memories 104 or 204 in the form of instruction/program (e.g., instruction, executable code, etc.) executable by the one or more processors 102 or 202. The one or more processors 102 or 202 may control the one or more memories 104 or 204 and the one or more transceivers 105 or 206 and may perform the operation of the BS (e.g., NG-RAN, gNB, eNB, RAN, cell, etc.) described in the present disclosure by executing the instruction/program stored in the one or more memories 104 or 204.

Furthermore, the instructions for performing the operation of the BS (e.g., NG-RAN, gNB, eNB, RAN, cell, etc.) described in the present disclosure may be stored in a non-volatile (or non-transitory) computer readable storage medium. The storage medium may be included in the one or more memories 104 or 204. In addition, the instructions stored in the storage medium may be executed by the one or more processors 102 or 202, and the operation of the BS (e.g., NG-RAN, gNB, eNB, RAN, cell, etc.) described in the present disclosure may be performed.

So far, the preferred embodiment has been described in an exemplary manner. However, the disclosure of the present specification is not limited to the specific embodiment and may be modified, altered, or improved in various forms within the inventive concept and the scope written in the claims of the present disclosure.

In the exemplary system described above, the methods are described based on a flowchart as a series of steps or blocks. However, the methods are not limited to the order of the steps described above, and a certain step may be performed in a different order or performed simultaneously. Furthermore, it is understood that the steps shown in the flowchart are not mutually exclusive, but another step may be included, or one or more steps may be deleted without influencing the scope to those ordinary skilled in the art.

Claims in the present description can be combined in various ways. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing communication, the method performed by a base station and comprising:
   transmitting a timing advance (TA) offset for uplink (UL) communication to a user equipment (UE);
   determining a subcarrier spacing (SCS) for sidelink (SL) communication; and
   transmitting SL configuration information including information about the SCS for SL communication, to the UE,
   wherein the SCS for SL communication is determined based on information related to a distance, the TA offset for UL communication, and the TA offset for SL communication, and
   wherein the information related to the distance is a cell radius of the base station or a distance between the base station and the UE.

2. The method of claim 1,
   wherein the TA offset for the SL communication is set to be the same as the TA offset for the UL communication.

3. The method of claim 1,
   wherein the TA offset for the SL communication is set to 0 us.

4. The method of claim 1,
   wherein the SCS for SL communication is determined as at least one of 15 kHz, 30 kHz, and/or 60 kHz.

5. The method of claim 1,
   wherein the determining further comprises:
   determining whether the TA offset for the SL communication is set to 0us, or is set to be equal to TA offset for the UL communication.

6. The method of claim 5,
   wherein, when the TA offset for the SL communication is set to 0us, the SCS for the SL communication is determined to be one set of i) 15 kHz, ii) 15 kHz and 30 kHz, or iii) 15 kHz, 30 kHz and 60 kHz, based on which of the plurality of intervals the distance according to the information related to the distance is included.

7. A method for performing communication, the method performed by a User Equipment (UE) and comprising:
   receiving, from a base station, a Timing Advance (TA) offset for uplink (UL) communication;
   receiving, from the base station, sidelink (SL) configuration information comprising information about a subcarrier spacing (SCS) for SL communication; and
   transmitting, based on the SL configuration information, an SL signal,
   wherein the SCS for SL communication is determined, by the base station, based on information related to a distance, a TA offset for UL communication, and a TA offset for SL communication, and
   wherein the information related to the distance is a cell radius of the base station or a distance between the base station and the UE.

8. A User Equipment (UE) for performing communication, the UE comprising:
   at least one transceiver;
   at least one processor; and
   at least one memory that stores instructions and is operably electrically connectable with the at least one processor,
   wherein the operations performed based on the instructions being executed by the at least one processor include:
   receiving, from a base station, a Timing Advance (TA) offset for uplink (UL) communication;
   receiving, from the base station, sidelink (SL) configuration information comprising information about a subcarrier spacing (SCS) for SL communication; and
   transmitting, based on the SL configuration information, an SL signal,
   wherein the SCS for SL communication is determined, by the base station, based on information related to a distance, a TA offset for UL communication, and a TA offset for SL communication, and
   wherein the information related to the distance is a cell radius of the base station or a distance between the base station and the UE.

* * * * *